(12) United States Patent
Iwakura

(10) Patent No.: US 11,115,601 B2
(45) Date of Patent: Sep. 7, 2021

(54) IMAGE PROCESSING APPARATUS, IMAGING APPARATUS, AND IMAGE PROCESSING METHOD

(71) Applicant: CANON KABUSHIKI KAISHA, Tokyo (JP)

(72) Inventor: Yasushi Iwakura, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 16/429,296

(22) Filed: Jun. 3, 2019

(65) Prior Publication Data
US 2019/0387150 A1 Dec. 19, 2019

(30) Foreign Application Priority Data
Jun. 13, 2018 (JP) .............................. JP2018-113143

(51) Int. Cl.
*H04N 5/235* (2006.01)
*H04N 5/225* (2006.01)
(Continued)

(52) U.S. Cl.
CPC ............. *H04N 5/2351* (2013.01); *G06T 5/50* (2013.01); *H04N 5/2258* (2013.01);
(Continued)

(58) Field of Classification Search
CPC ...... H04N 5/2351; H04N 5/2258; G06T 5/50; G06T 2207/10016; G06T 2207/10048;
(Continued)

(56) References Cited

U.S. PATENT DOCUMENTS

| 4,602,861 A * | 7/1986 | Taniguchi | ................ G02B 7/36 |
| | | | 396/106 |
| 8,531,562 B2 * | 9/2013 | Schmidt | ........... H04N 5/232121 |
| | | | 348/262 |

(Continued)

FOREIGN PATENT DOCUMENTS

| JP | 2008-157924 A | 7/2008 |
| JP | 2013-080225 A | 5/2013 |

(Continued)

*Primary Examiner* — Nasim N Nirjhar
*Assistant Examiner* — Asmamaw G Tarko
(74) *Attorney, Agent, or Firm* — Venable LLP

(57) ABSTRACT

An image processing apparatus including a first acquisition unit for acquiring a visible-light image signal representing a visible-ray image which comes into focus at a first distance and an infrared image signal representing an infrared-ray image which comes into focus at a second distance that is shorter than the first distance and an infrared-ray image which comes into focus at a third distance that is longer than the first distance; a second acquisition unit for acquiring first brightness information, hue information, and saturation information from the visible-light image signal and at least second brightness information from the infrared image signal; a third acquisition unit for acquiring third brightness information based on edge information obtained from the first brightness information and edge information obtained from the second brightness information; and a generation unit for generating a second visible-light image using the third brightness information, the hue information, and the saturation information.

19 Claims, 22 Drawing Sheets

(51) Int. Cl.
G06T 5/50 (2006.01)
H04N 5/33 (2006.01)

(52) U.S. Cl.
CPC ............... *G06T 2207/10016* (2013.01); *G06T 2207/10048* (2013.01); *G06T 2207/20016* (2013.01); *G06T 2207/20212* (2013.01); *G06T 2207/30252* (2013.01)

(58) Field of Classification Search
CPC . G06T 2207/20016; G06T 2207/20212; G06T 2207/30252
USPC .......................................................... 348/164
See application file for complete search history.

(56) References Cited

U.S. PATENT DOCUMENTS

| | | | |
|---|---|---|---|
| 10,176,543 B2* | 1/2019 | Hosokawa | H04N 5/33 |
| 10,244,190 B2* | 3/2019 | Boulanger | H04N 5/332 |
| 10,740,898 B2* | 8/2020 | Israelsen | G01J 5/0066 |
| 2006/0268110 A1* | 11/2006 | Koike | G06T 5/50 |
| | | | 348/159 |
| 2008/0111075 A1* | 5/2008 | Fleury | B60S 1/0844 |
| | | | 250/338.1 |
| 2010/0103268 A1* | 4/2010 | Tokuyama | H04N 9/77 |
| | | | 348/162 |
| 2012/0281081 A1* | 11/2012 | Atif | G02B 27/0075 |
| | | | 348/79 |
| 2013/0083199 A1 | 4/2013 | Choi et al. | |
| 2014/0198234 A1* | 7/2014 | Kobayashi | H04N 1/32144 |
| | | | 348/231.99 |
| 2014/0340515 A1* | 11/2014 | Tanaka | G06T 5/50 |
| | | | 348/143 |
| 2017/0112353 A1* | 4/2017 | Ikemoto | A61B 1/00009 |
| 2017/0347040 A1* | 11/2017 | Zhang | H04N 5/33 |
| 2020/0314313 A1* | 10/2020 | Wang | H04N 9/07 |
| 2020/0389607 A1* | 12/2020 | Chino | H04N 9/77 |
| 2021/0102795 A1* | 4/2021 | Aldahir | G01B 5/28 |

FOREIGN PATENT DOCUMENTS

| | | | | |
|---|---|---|---|---|
| JP | 2014-241584 A | 12/2014 | | |
| JP | 2016-154588 A | 9/2016 | | |
| JP | 2019216376 A | * 12/2019 | ........... H04N 5/2351 |

* cited by examiner

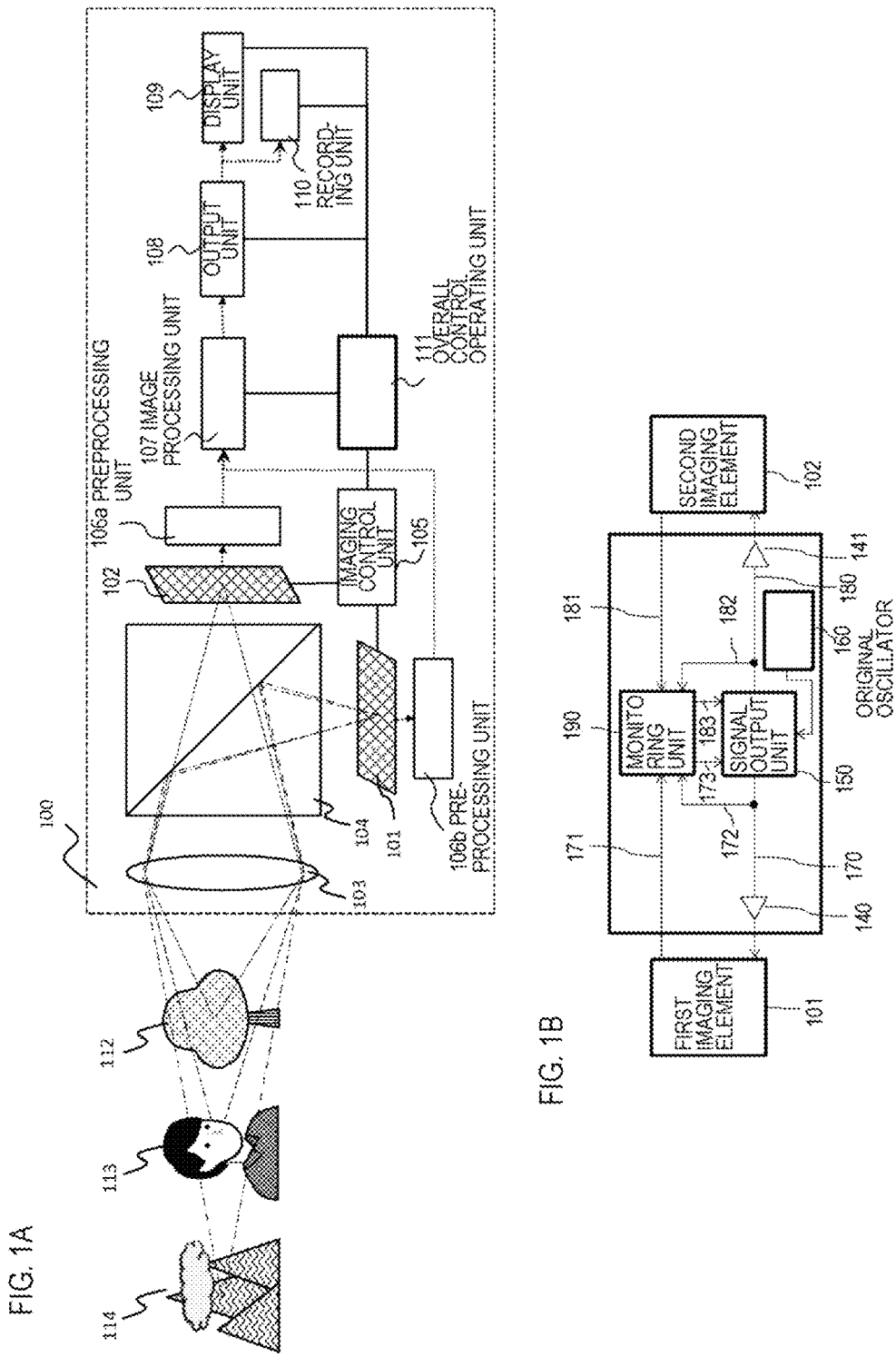

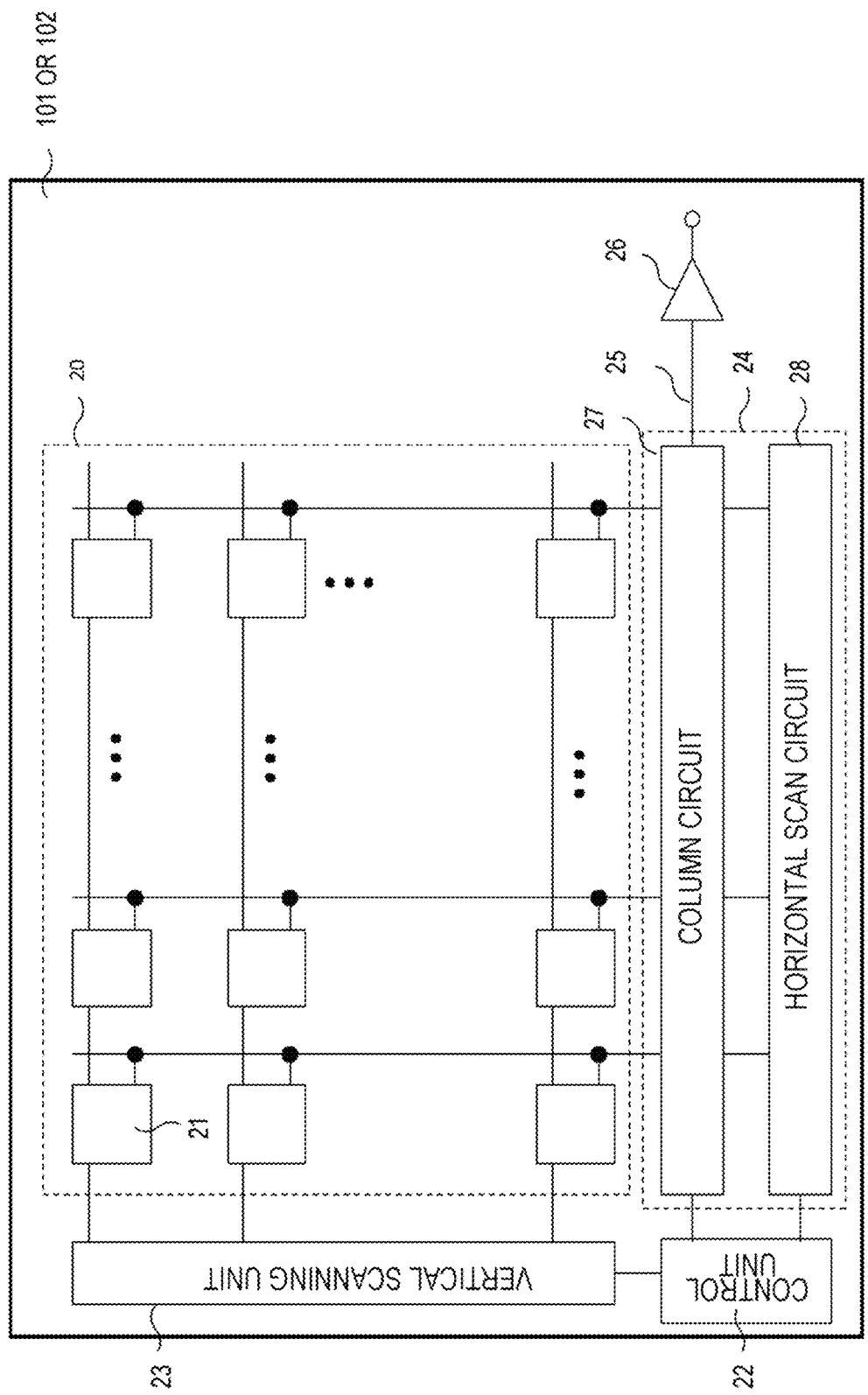

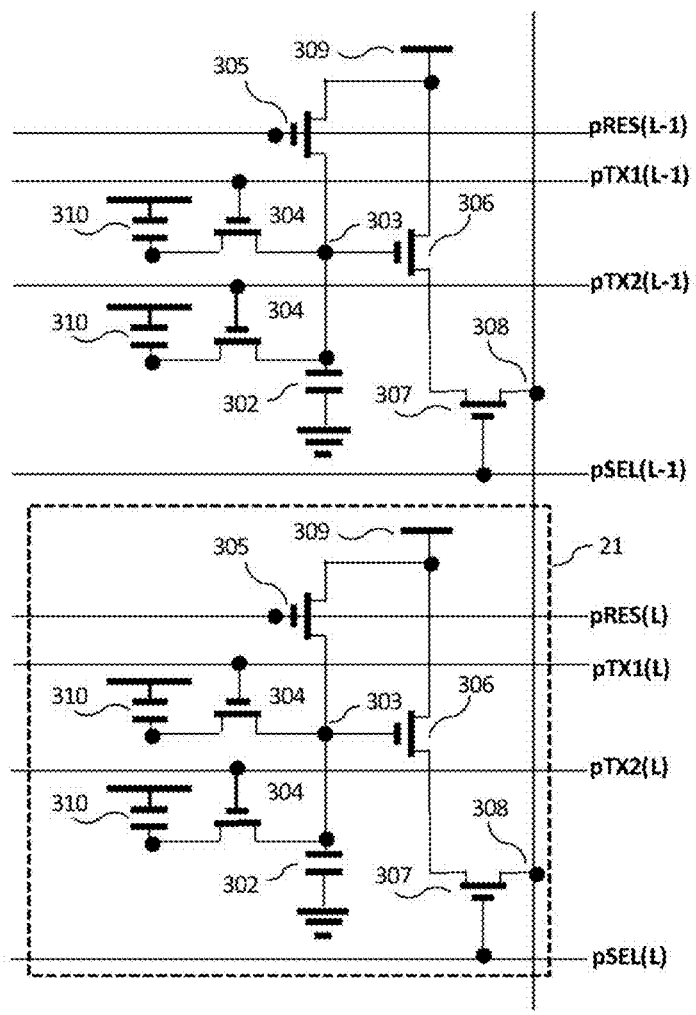

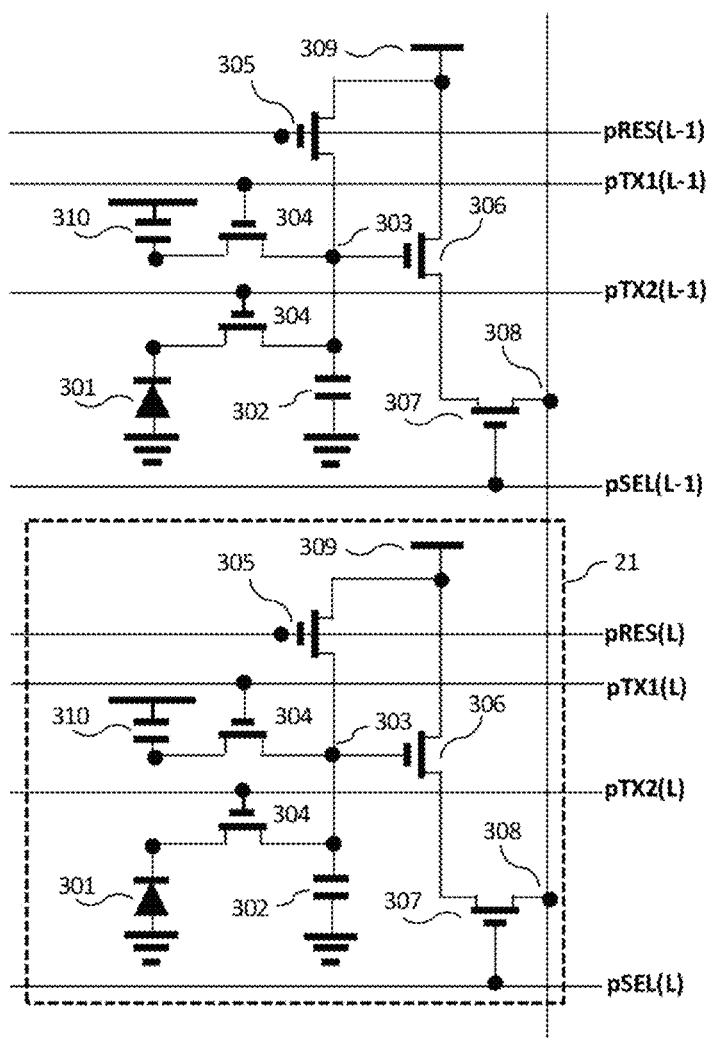

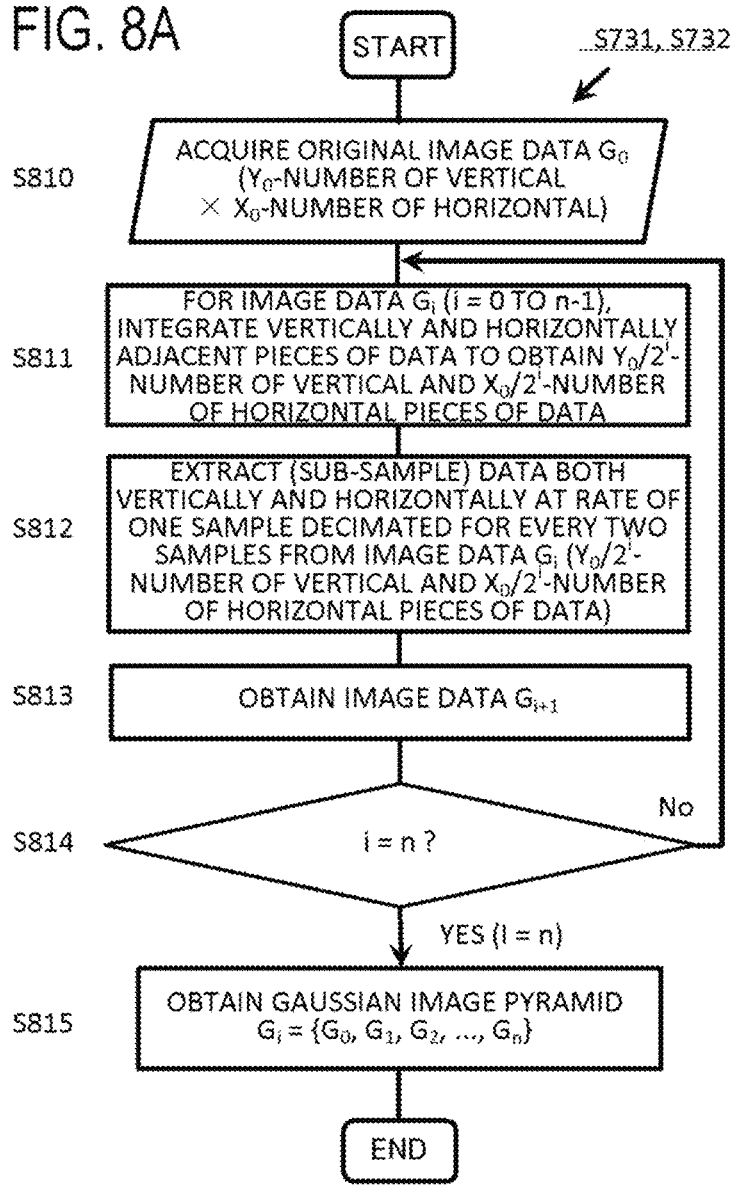

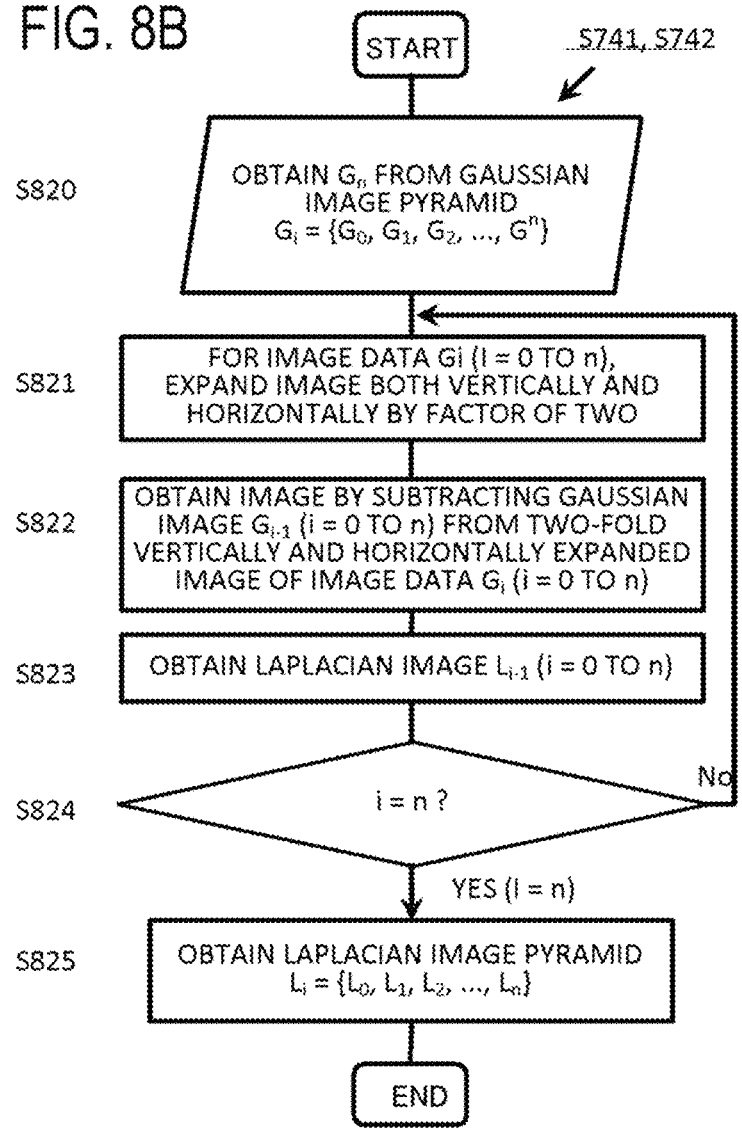

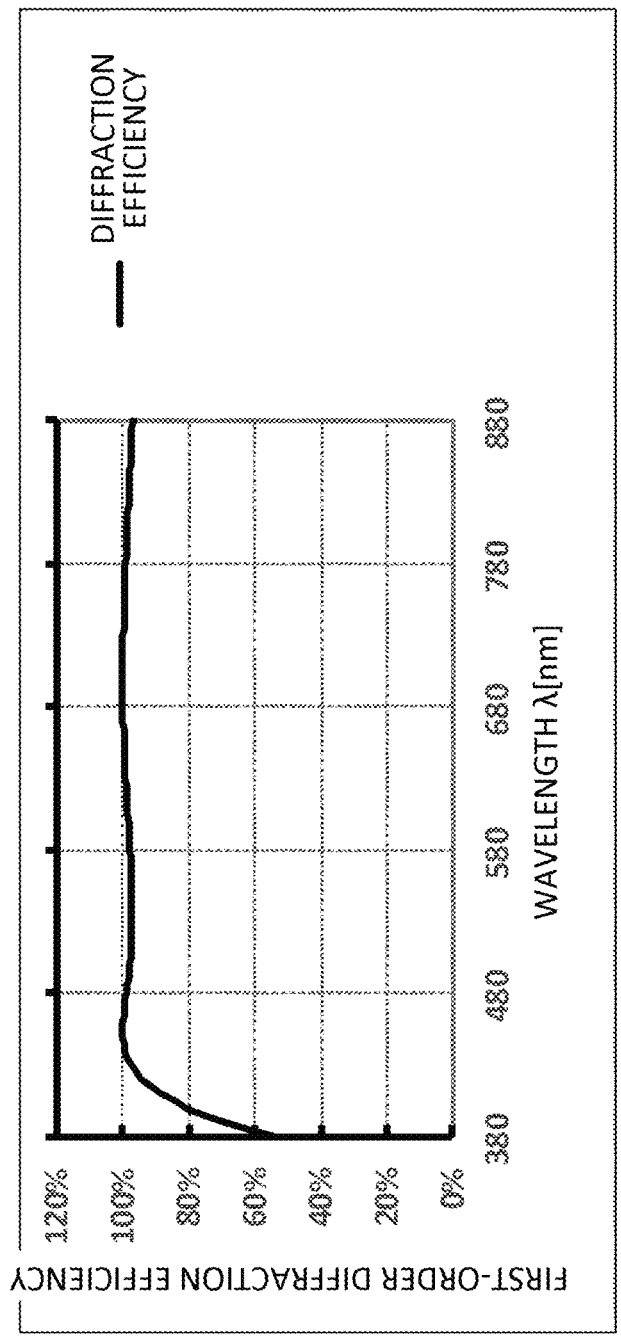

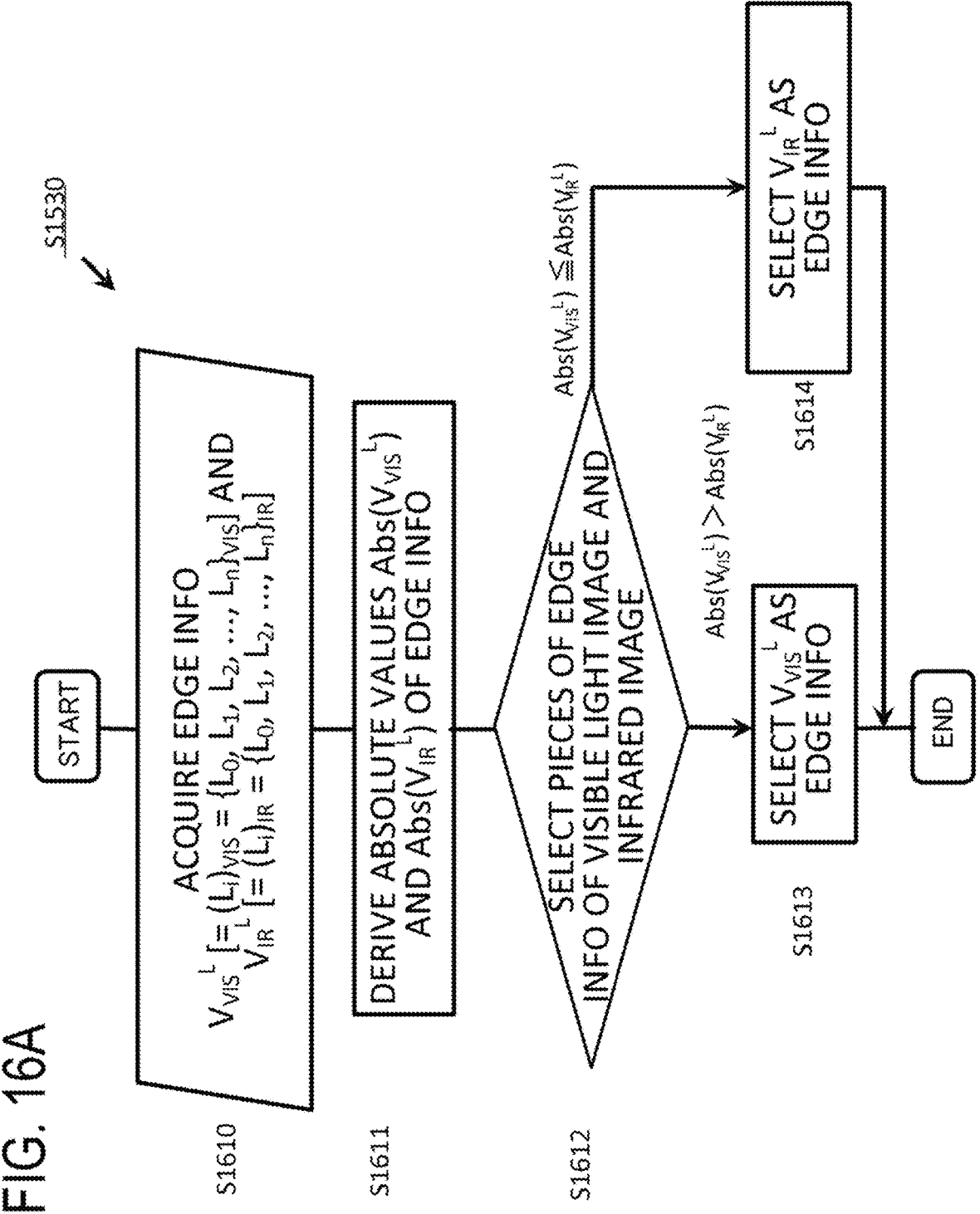

IMAGE PROCESSING APPARATUS, IMAGING APPARATUS, AND IMAGE PROCESSING METHOD

BACKGROUND OF THE INVENTION

Field of the Invention

The present invention relates to an image processing apparatus, an imaging apparatus, and an image processing method.

Description of the Related Art

One of the existing methods for obtaining an image in which a plurality of (at least two) subjects at different distances from an imaging apparatus are simultaneously in focus is to deepen a depth of field by narrowing an aperture of an imaging lens. With the method of narrowing the aperture of an imaging lens, in an environment with plenty of reflected light from the subject (for example, outdoors in fine weather), even with a moving image of which an exposure period is restricted, an in-focus image of a plurality of subjects with a high SN ratio can be obtained. However, when the method is used in an environment with insufficient reflected light from the subject (for example, when cloudy or at night), characteristics such as moving image performance (exposure period and number of frames) and the SN ratio of images deteriorate.

In addition, widening the aperture of the imaging lens in order to obtain reflected light from the subject while avoiding deterioration in characteristics of moving image performance (exposure period and number of frames) and the SN ratio of images in an environment with insufficient reflected light from the subject causes the depth of field to become shallower. As a result, in an environment with insufficient reflected light from the subject, a plurality of subjects at different distances are less likely to simultaneously come into focus within an angle of view.

As a configuration for providing sufficient moving image performance, SN ratio of images, and depth of field in an environment with insufficient reflected light from the subject, Japanese Patent Application Laid-open No. 2008-157924 discloses a configuration in which an optical system which brings different distances into focus is provided inside an imaging apparatus. The configuration disclosed in Japanese Patent Application Laid-open No. 2008-157924 includes: an imaging element in which are arranged a plurality of photoelectric conversion units having sensitivity with respect to visible light or infrared light; and an optical system which brings a distant subject and a nearby subject into focus on an imaging surface of the imaging element. Japanese Patent Application Laid-open No. 2008-157924 discloses converting superimposed luminous fluxes incident from a distant subject and a nearby subject into an electric signal with the imaging element and outputting the electric signal including image information from the imaging element.

The imaging element according to Japanese Patent Application Laid-open No. 2008-157924 receives a luminous flux via an optical system that brings the distant subject into focus and a luminous flux via an optical system that brings the nearby subject into focus. However, the imaging element according to Japanese Patent Application Laid-open No. 2008-157924 also receives an out-of-focus image of the nearby subject from the optical system that brings the distant subject into focus and an out-of-focus image of the distant subject from the optical system that brings the nearby subject into focus. In other words, the imaging element according to Japanese Patent Application Laid-open No. 2008-157924 receives both an in-focus image and an out-of-focus image of the distant subject and both an in-focus image and an out-of-focus image of the nearby subject. The out-of-focus images are visualized as a decline in contrast or a fuzziness of a subject contour in a visible light image.

SUMMARY OF THE INVENTION

In consideration of the problem described above, an object of the present invention is to provide a technique which enables a visible light image with an extended depth of field to be acquired while suppressing a decline in image quality.

The first aspect of the disclosure is an image processing apparatus comprising a processor configured to operate as: a first acquisition unit configured to acquire (a) a visible light image signal representing a visible-ray image which comes into focus at a first distance and (b) an infrared image signal representing (b1) an infrared-ray image which comes into focus at a second distance that is shorter than the first distance and (b2) an infrared-ray image which comes into focus at a third distance that is longer than the first distance; a second acquisition unit configured to acquire first brightness information, hue information, and saturation information from the visible light image signal and at least second brightness information from the infrared image signal; a third acquisition unit configured to acquire third brightness information based on edge information obtained from the first brightness information and edge information obtained from the second brightness information; and a generation unit configured to generate a second visible light image using the third brightness information, the hue information, and the saturation information.

The second aspect of the disclosure is an imaging apparatus, comprising: an imaging lens having a first focal length at wavelengths in a range of visible light, and a second focal length that is shorter than the first focal length and a third focal length that is longer than the first focal length at wavelengths in a range of infrared light; and an imaging element which receives a luminous flux transmitted through the imaging lens and which outputs a visible light image signal representing a visible-ray image which comes into focus at a first distance and an infrared image signal representing an infrared-ray image which comes into focus at a second distance that is shorter than the first distance and an infrared-ray image which comes into focus at a third distance that is longer than the first distance.

The third aspect of the disclosure is an image processing method performed by an image processing apparatus, the image processing method comprising: a first acquisition step of extracting first brightness information, hue information, and saturation information from a visible light image signal representing a visible-ray image which comes into focus at a first distance, and acquiring at least second brightness information from an infrared image signal representing an infrared-ray image which comes into focus at a second distance that is shorter than the first distance and an infrared-ray image which comes into focus at a third distance that is longer than the first distance; a second acquisition step of acquiring third brightness information based on edge information obtained from the first brightness information and edge information obtained from the second brightness information; and a generation step of generating a second visible light image using the third brightness information, the hue information, and the saturation information.

According to the present invention, a visible light image with an extended depth of field can be acquired while suppressing a decline in image quality.

Further features of the present invention will become apparent from the following description of exemplary embodiments with reference to the attached drawings.

BRIEF DESCRIPTION OF THE DRAWINGS

FIGS. 1A and 1B show configuration diagrams of an imaging apparatus according to a first embodiment;

FIG. 2 shows a configuration diagram of an imaging element according to the embodiment;

FIGS. 3A to 3D show equivalent circuit diagrams of the imaging element according to the embodiment;

FIGS. 8A and 8B show details of a multiresolution analyzing process and an edge information deriving process;

FIG. 13 shows an example of incident wavelength dependence of combined diffraction efficiency of a diffractive lens;

FIGS. 16A and 16B show details of a determination process; and

DESCRIPTION OF THE EMBODIMENTS

Figure 3A:
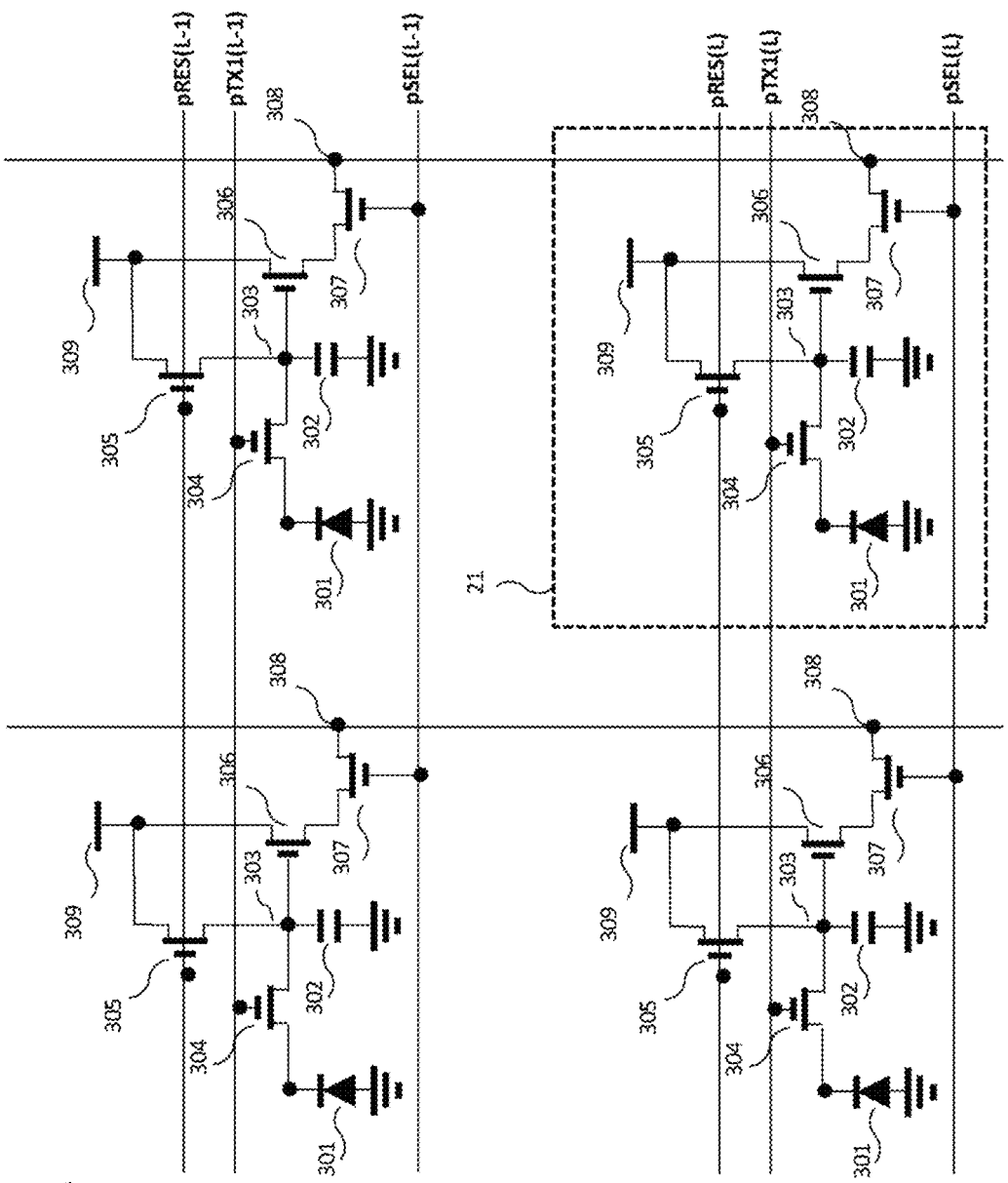

Hereinafter, image signal processing methods and imaging apparatuses according to respective embodiments will be described with reference to the drawings.

First Embodiment

FIG. 1A is a block diagram showing an example of an imaging apparatus according to the present embodiment. The imaging apparatus is an apparatus which acquires still images, moving images, and the like and of which specific examples include a digital still camera, a digital camcorder, and a monitoring camera.

FIG. 1A is a diagram showing a configuration of an imaging apparatus 100 according to the present embodiment. The imaging apparatus 100 includes a first imaging element 101, a second imaging element 102, a lens 103, a beam splitter 104, an imaging control unit 105, preprocessing units 106a and 106b, an image processing unit 107, an output unit 108, a display unit 109, a recording unit 110, and an overall control operating unit 111.

The imaging elements 101 and 102 receive optical images created by luminous fluxes emitted from subjects 112 to 114 and convert the optical images into electric signals, and output the electric signals to subsequent-stage preprocessing units 106a and 106b.

The lens 103 serves a function of focusing optical images emitted from the subjects 112 to 114 on the imaging elements 101 and 102. With the lens 103, in-focus distances between a subject and the imaging apparatus, and focal lengths inside the imaging apparatus at wavelengths in a range of visible light and in a range of infrared light are different from each other. In addition, with respect to the imaging elements 101 and 102, by mutually displacing the in-focus distances and the in-focus positions of the imaging elements at wavelengths in a range of infrared light, information on a plurality of images with different in-focus distances at the wavelengths in the range of infrared light can be acquired. The lens 103 may be configured as described later with reference to FIGS. 10A and 10B to FIG. 14.

The beam splitter (a luminous flux branching unit) 104 serves a function of distributing a luminous flux having arrived via the lens 103 to the imaging elements 101 and 102. The beam splitter 104 can be configured using, for example, a prism.

The imaging control unit 105 serves a function of synchronizing shutter and exposure operations of the imaging elements 101 and 102. Specifically, the imaging control unit 105 is responsible for generating a synchronization signal for synchronizing operations of the two imaging elements 101 and 102, generating a shutter operation period and an image signal, and generating a signal for controlling a period related to output.

The preprocessing units 106a and 106b subject electric signals acquired from the imaging elements 101 and 102 to preprocessing such as horizontal/vertical synchronization and encoding, and transmit the preprocessed signals to the subsequent-stage image processing unit 107 as image signals. When the signals output from the imaging elements 101 and 102 are analog signals, the preprocessing units 106a and 106b may internally include an analog/digital conversion (A/D conversion) circuit and apply the preprocessing described above after converting the analog signals into digital signals. Hereinafter, when the preprocessing units 106a and 106b need not be distinguished from each other, the preprocessing units 106a and 106b may simply be referred to as the preprocessing unit 106.

The image processing unit 107 acquires respective image signals from the preprocessing units 106a and 106b in subsequent stages of the imaging elements 101 and 102, temporarily stores the images, and performs various image processing. Examples of image processing performed by the image processing unit 107 include extraction of brightness, chromaticity, and saturation information of an image, extraction and selection of contour information, and reconstruction of a visible light image with an extended depth of focus. The image processing unit 107 may be constituted by a logic circuit such as an ASIC. Alternatively, the image processing unit 107 may be realized by having a general-purpose processor execute a program. In the present embodiment, the imaging apparatus 100 including the image processing unit 107 corresponds to an image processing apparatus. In addition, while a configuration in which the image processing unit 107 is built into the imaging apparatus 100 will be described in the present embodiment, an image processing apparatus separate from the imaging apparatus 100 may include the image processing unit 107.

The output unit 108 performs, based on a processing result of the image processing unit 107, processing to a signal suitable for output to the display unit 109 and the recording unit 110 in subsequent stages and signal output.

The overall control operating unit 111 controls operations of the imaging control unit 105, the image processing unit 107, the output unit 108, the display unit 109, and the recording unit 110.

FIG. 1B illustrates the example of the imaging control unit 105 in greater detail. The imaging control unit 105 includes a signal output unit 150, an original oscillator 160, and a monitoring unit 190. The original oscillator 160 generates a periodic signal. The signal output unit 150 outputs a control signal for controlling the first imaging element 101 and the second imaging element 102. The signal output unit 150 and the first imaging element 101 are electrically connected to each other by wiring 170, and the signal output unit 150 and the second imaging element 102 are electrically connected to each other by wiring 180. In order to synchronize the two imaging elements with high accuracy, the length of the wiring 170 and the length of the wiring 180 are approximately the same. In this case, an approximately same length may not only be a same length but may also be a different length within a range in which the effect of the present embodiment is produced. Alternatively, in order to synchronize the two imaging elements with high accuracy, buffer circuits 140 and 141 may be provided in a preceding stage of control signal input terminals to the imaging elements.

The monitoring unit 190 is electrically connected to the respective imaging elements 101 and 102 by wirings 171 and 181 and electrically connected to the signal output unit 150 by wirings 173 and 183. The monitoring unit 190 monitors signals (a path via the wiring 171 or 181) including information on timings of start of exposure and end of exposure at the imaging elements 101 and 102 on the basis of a control signal (a path via wiring 172 or 182) generated from the output unit 150. Based on a difference (a signal delay time or a phase amount) between the control signal generated from the signal output unit 150 and signals returned from the imaging elements 101 and 102, the monitoring unit 190 performs an adjustment of the control signal to each imaging apparatus with respect to the signal output unit 150 via the wiring 173 or 183. Examples of an adjustment of a control signal include a correction to the signal delay time or the signal phase amount.

<Block Diagram of Imaging Element>

FIG. 2 is a block diagram showing configurations of the imaging elements 101 and 102 arranged in the imaging apparatus 100. The imaging element 101 and the imaging element 102 have similar configurations.

The imaging elements 101 and 102 are constituted by an imaging region 20 in which a plurality of pixels 21 are two-dimensionally arranged, a control unit 22, a vertical scanning unit 23, a pixel signal processing unit 24, and an output unit 26. The control unit 22, the vertical scanning unit 23, the pixel signal processing unit 24, and the output unit 26 are arranged in an outer periphery of the imaging region 20.

The control unit 22 supplies control signals, power-supply voltage, and the like to the vertical scanning unit 23, the pixel signal processing unit 24, and the output unit 26. The vertical scanning unit 23 supplies a drive signal for each pixel row or for each plurality of pixel rows with respect to the plurality of pixels 21 arranged in the imaging region 20.

In order to synchronize the first imaging element 101 and the second imaging element 102 with high accuracy, the imaging control unit 105 shown in FIGS. 1A and 1B are electrically connected to the control unit 22.

The vertical scanning unit 23 can be constituted by a shift register or an address decoder.

The pixel signal processing unit 24 is configured so as to include a column circuit 27, a horizontal scan circuit 28, and a horizontal output line 25. The column circuit is configured so as to include a plurality of circuits. For example, the plurality of circuits may include a signal holding circuit, an amplifier circuit, a noise elimination circuit, and an analog-digital conversion circuit. The horizontal scan circuit can be constituted by a shift register or an address decoder. A signal to be output to the horizontal output line 25 may be any of an analog signal and a digital signal.

The output unit 26 is configured so as to include a buffer circuit and transmits, to the preprocessing unit 106a or 106b in a subsequent stage of the imaging element 101 or 102, a signal transmitted via the horizontal output line 25.

<Equivalent Circuit Diagram of Pixel Unit>

FIG. 3A shows a configuration of an equivalent circuit of the pixel 21 shown in FIG. 2. FIG. 3A represents an example constituted by four pixels. The pixel 21 includes a photoelectric conversion unit 301, a floating diffusion 302 (FD 302), a transfer switch 304, an input node 303, a reset transistor 305, an amplifier unit 306, and a selection transistor 307. The plurality of pixels 21 arranged in a same row are connected to control lines pTX1, pRES, and pSEL which respectively perform simultaneous operation/stop control of the transfer switch 304, the reset transistor 305, and the selection transistor 307.

The photoelectric conversion unit 301 generates a charge using incident light and accumulates the generated charge. The photoelectric conversion unit 301 is, for example, a photodiode.

The transfer switch 304 transfers the charge generated by the photoelectric conversion unit 301 to the FD 302. The transfer switch 304 is controlled by a signal supplied through the control line pTX1. The transfer switch 304 is, for example, a MOS transistor.

The FD 302 serves a function of receiving and holding, by an operation of the transfer switch 304, a charge generated by the photoelectric conversion unit 301, and constitutes the input node 303 of the amplifier unit 306.

The amplifier unit 306 amplifies a charge accumulated in the input node 303 of the amplifier unit 306 and outputs the amplified charge as a pixel signal to a vertical output line 308. The amplifier unit 306 is, for example, a source follower circuit.

The selection transistor 307 selects a pixel 21 to output a signal to the vertical output line 308.

The reset transistor 305 performs a reset operation in which a charge in the input node 303 is discharged to a power supply 309 by a signal of the control line pRES and a potential of the input node 303 is set to a potential of the power supply 309.

Figure 3B:
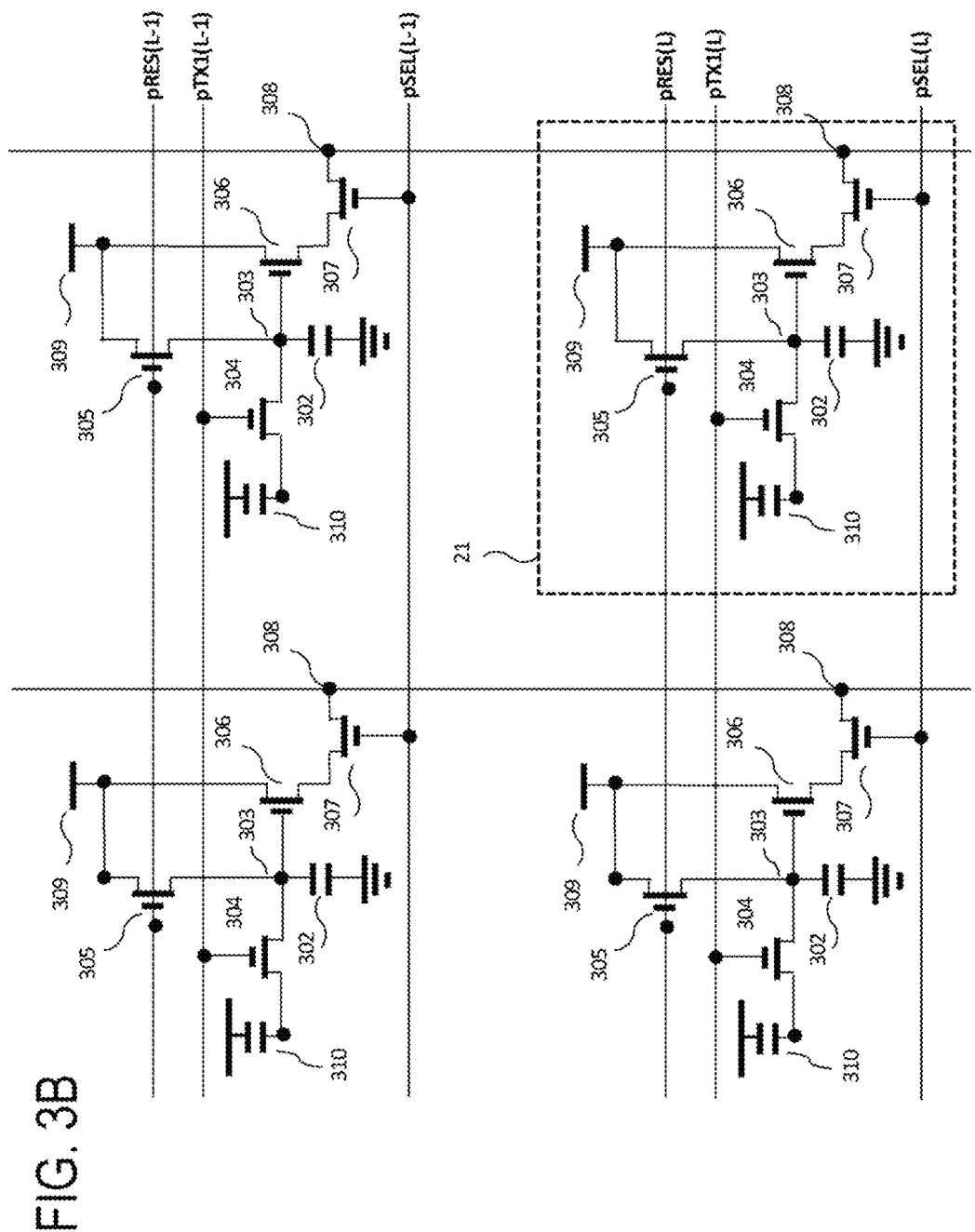

FIG. 3B shows an example constituted by four pixels in a similar manner to FIG. 3A. However, a photoelectric conversion unit 310 is made of a photoelectric conversion film sandwiched between electrodes that oppose each other, and the electrode positioned on a light incidence-side with respect to an imaging surface is constituted by a conductive material with light transmittivity. Examples of a conductive material with light transmittivity include metal thin films, so-called transparent electrodes made of indium tin oxide (ITO), zinc oxide (ZnO), or indium gallium zinc oxide (IGZO), and oxide semiconductors. The photoelectric conversion film 310 is a material which generates a charge due to incidence of light of a desired wavelength. Examples of an incident light wavelength band which generates a charge in the photoelectric conversion film 310 include a visible wavelength band (380 to 780 nm), a wavelength region (380 nm to 2.5 µm) that straddles visible and near infrared light, and a near infrared region (780 nm to 2.5 µm). In the present disclosure, an infrared region may be a near-infrared region, a mid-infrared region (2.5 to 4 µm), or a wavelength region that straddles near-infrared light and mid-infrared light. Examples of a material that generates a charge in the photoelectric conversion film 310 include organic semiconductor materials, inorganic materials such as metal halide perovskite, and materials containing so-called quantum dots with a core or an outer shell made of an organic or inorganic material. In addition, a film structure may be formed by stacking and bonding a single layer or a plurality of layers of the material that generates a charge in the photoelectric conversion film 310 described above.

FIG. 3C shows a modification of FIG. 3B. In the present example, two photoelectric conversion units 310 are provided for each pixel 21. A charge generated by exposure to the photoelectric conversion units 310 provided for each pixel 21 is transferred to the FD 302 by the transfer switch 304.

The transfer switch 304 connected to the two photoelectric conversion units 310 provided for each pixel 21 is controlled by signals supplied through the control lines pTX1 and pTX2. While two photoelectric conversion units 310 for each pixel 21 are illustrated in FIG. 3C, two or more photoelectric conversion units 310 may be provided for each pixel 21. In addition, while one transfer switch 304 and one control line of the transfer switch are provided with respect to one photoelectric conversion unit 310, the numbers of the transfer switch 304 and the control line of the transfer switch may be changed in accordance with the number of photoelectric conversion units 310 provided for each pixel 21.

In addition, the plurality of photoelectric conversion units 310 may be juxtaposed so as to mutually have regions that do not overlap with each other in the pixel 21 in a plan view of the imaging surface. Alternatively, the plurality of photoelectric conversion units 310 may be positioned so as to mutually have regions that overlap with each other in the pixel 21 in a plan view of the imaging surface, and regions at positions that mutually overlap with each other in a plan view may form a positional relationship of being stacked with respect to a normal orientation of the imaging surface.

The plurality of photoelectric conversion units 310 may respectively have approximately matching characteristics or clearly different characteristics with respect to a wavelength band and intensity of incident light that generates a charge. For example, the plurality of photoelectric conversion units 310 in the pixel 21 may all be assigned so as to have charge generating characteristics with respect to one color or one band among the three primary colors (red, green, and blue) or the three complementary colors (cyan, magenta, and yellow) of visible light, full white, and the near infrared band. Alternatively, one of the photoelectric conversion units 310 in the pixel 21 may be assigned to one color or one band among the three primary colors or the three complementary colors of visible light, full white, and the near infrared band, and other photoelectric conversion units 310 may be assigned to another color or another band.

FIG. 3D shows a modification of FIG. 3C. In the present example, one photoelectric conversion unit 301 and one photoelectric conversion unit 310 are provided for each pixel 21. In a similar manner to FIG. 3C, charges generated by exposure to the photoelectric conversion units 301 and 310 provided for each pixel 21 are transferred to the FD 302 by the transfer switch 304. In addition, the transfer switch 304 connected to the photoelectric conversion units 301 and 310 provided for each pixel 21 is controlled by signals supplied through the control lines pTX1 and pTX2. Desired numbers of the photoelectric conversion unit 301 and the photoelectric conversion unit 310 may be provided for each pixel 21, and the numbers of the transfer switch 304 and the control line of the transfer switch may be changed in accordance with the number of photoelectric conversion units 301 and 310.

In FIG. 3D, the photoelectric conversion units 301 and 310 may be juxtaposed so as to mutually have regions that do not overlap with each other in the pixel 21 in a plan view of the imaging surface. Alternatively, the photoelectric conversion units 301 and 310 may be positioned so as to mutually have regions that overlap with each other in the pixel 21 in a plan view of the imaging surface, and regions at positions that mutually overlap with each other in a plan view may form a positional relationship of being stacked with respect to a normal orientation of the imaging surface.

In a similar manner to FIG. 3C, the photoelectric conversion units 301 and 310 may respectively have approximately matching characteristics or clearly different characteristics with respect to a wavelength band and intensity of incident light that generates a charge.

<Examples of Arrangement of Visible Light and Infrared Photoelectric Conversion Units in Imaging Element>

Figure 4A:
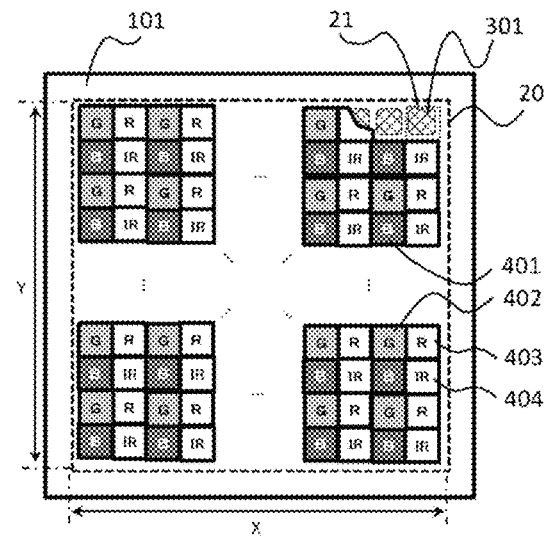
FIGS. 4A to 4D show configuration diagrams of the imaging element according to the embodiment.
Figure 4C:
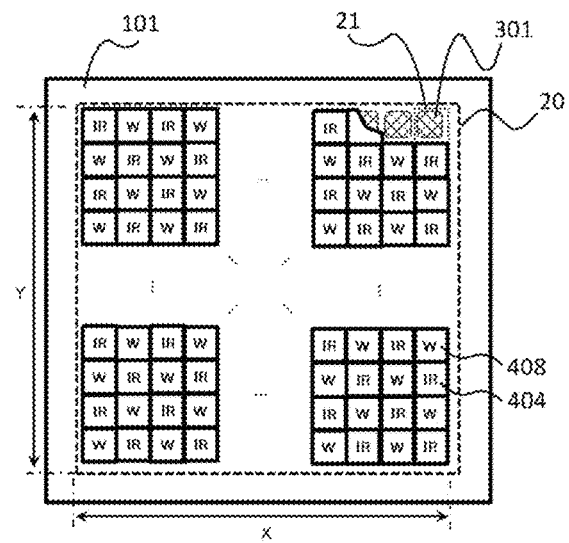
Figure 4B:
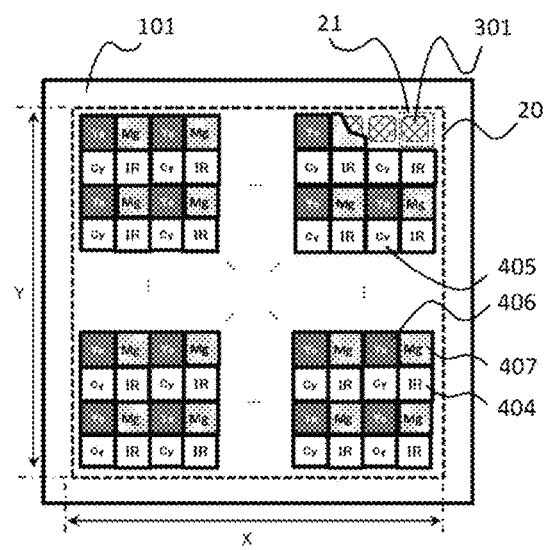
Figure 4D:
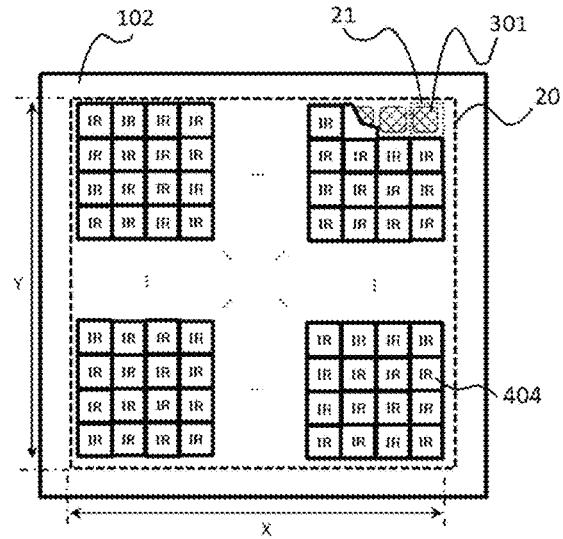

FIGS. 4A to 4C are, respectively, diagrams showing a configuration example of the imaging element 101. FIG. 4D is a diagram showing a configuration example of the imaging element 102.

The imaging element 101 includes the photoelectric conversion unit 301 for each pixel 21 in the imaging region 20, and a color filter which transmits a specific wavelength is arranged above the photoelectric conversion unit 301 in a plan view of an imaging surface. For example, in the configuration shown in FIG. 4A, color filters 401, 402, and 403 which transmit blue (B), green (G), and red (R) as visible light and a color filter 404 which transmits infrared light (IR) are arranged in a grid pattern. In the configuration shown in FIG. 4B, color filters 405, 406, and 407 which transmit cyan (Cy), yellow (Y), and magenta (Mg) as visible light and the color filter 404 which transmits infrared light (IR) are arranged in a grid pattern. In the configuration shown in FIG. 4C, a color filter 408 which transmits the entire visible light range (white (W)) and the color filter 404 which transmits infrared light (IR) are arranged in a grid pattern. In the imaging element 101 shown in FIGS. 4A to 4C, since photoelectric conversion units having sensitivity to visible light and infrared light are arranged on a same substrate, an optical system such as a prism for branching a luminous flux can be omitted as compared to a case where an imaging element is mounted in which the photoelectric conversion units are arranged on individual substrates.

As shown in FIG. 4D, the imaging element 102 includes the photoelectric conversion unit 301 in the pixel 21 in the imaging region 20 in a similar manner to the imaging element 101. In the imaging element 102, the color filter IR 404 which transmits infrared light (IR) with respect to all pixels is arranged above the photoelectric conversion unit 301.

In the configurations shown in FIGS. 4A to 4D, pixels having a color filter that transmits visible light among the pixels of the imaging element 101 correspond to a first pixel group. In addition, pixels having a color filter that transmits infrared light among the pixels of the imaging element 101 correspond to a second pixel group. The pixels of the imaging element 102 correspond to a third pixel group.

Figure 5C:
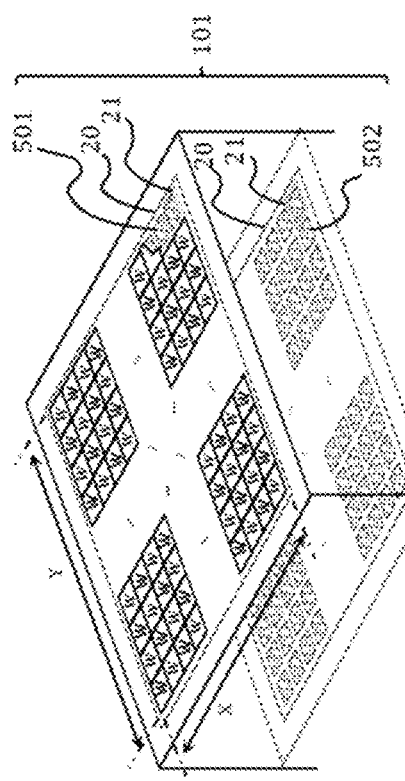
FIGS. 5A to 5C show configuration diagrams of an imaging element according to a modification.
Figure 5A:
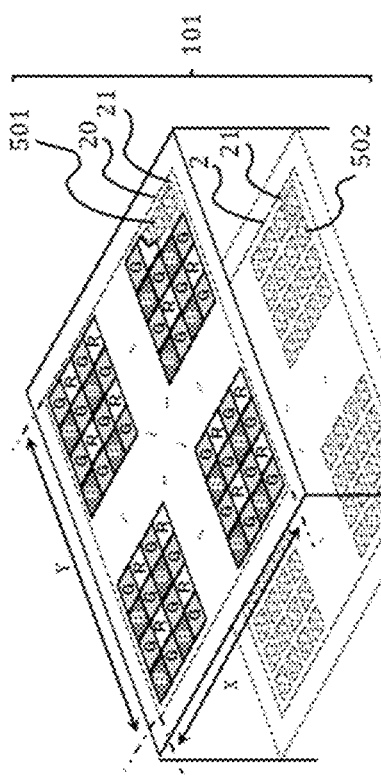
Figure 5B:
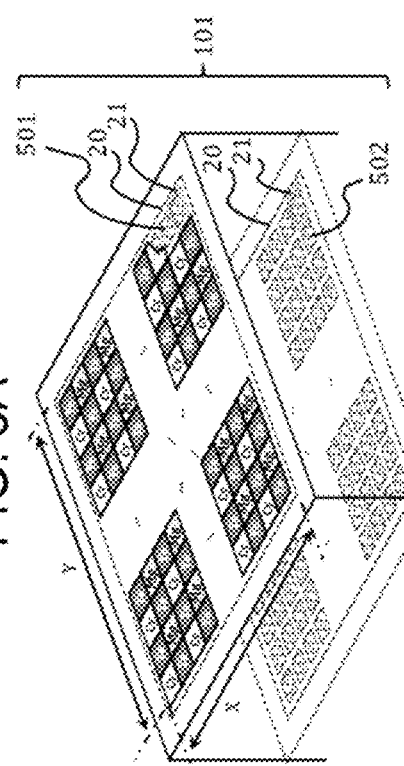

FIGS. 5A to 5C are diagrams showing other configuration examples of the imaging element 101. In all of the examples shown in FIGS. 5A to 5C, the imaging element 101 is constituted by one substrate.

For each pixel 21 in the imaging region 20, the imaging element 101 includes a photoelectric conversion unit 501 having sensitivity to visible light on a front surface side of the substrate and a photoelectric conversion unit 502 having sensitivity to infrared light below the photoelectric conversion unit 501. While a color filter which transmits a specific wavelength is arranged above the photoelectric conversion unit 501 in a plan view of an imaging surface, the color filter according to the present example has transmission characteristics with respect to infrared light in addition to visible light. The photoelectric conversion unit 502 having sensitivity to infrared light is capable of detecting infrared light because visible light attenuates before reaching the photoelectric conversion unit 502 in the process of propagating through the color filter and the photoelectric conversion unit 501 having sensitivity to visible light.

The example shown in FIG. 5A includes a color filter that transmits blue (B), green (G), and red (R) as visible light, and the example shown in FIG. 5B includes a color filter that transmits cyan (Cy), yellow (Y), and magenta (M) as visible light. The example shown in FIG. 5C includes a color filter that transmits white (W) as visible light.

Figure 6C:
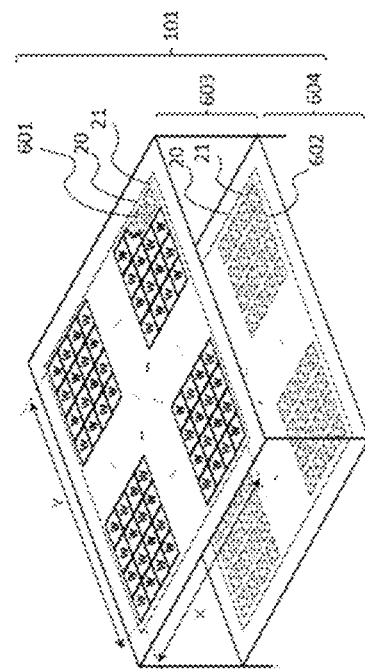
FIGS. 6A to 6C show configuration diagrams of an imaging element according to a modification.
Figure 6A:
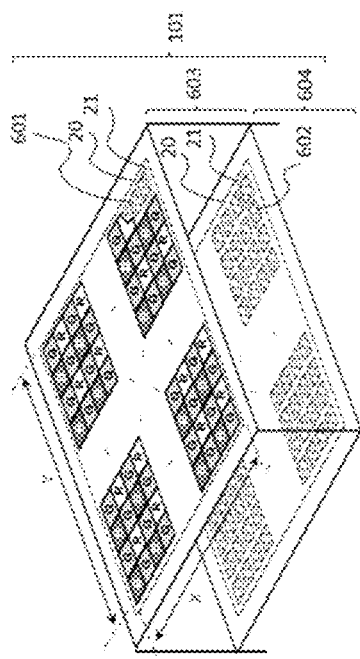
Figure 6B:
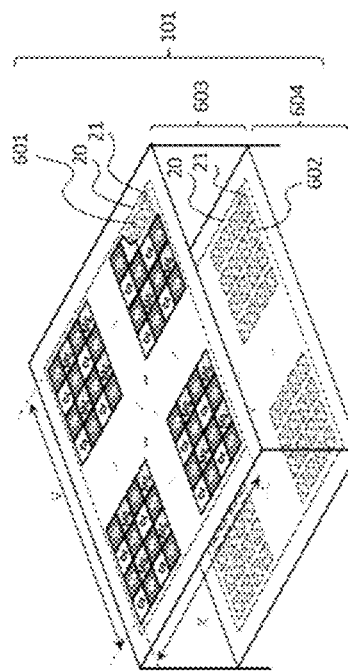

FIGS. 6A to 6C are diagrams showing yet other configuration examples of the imaging element 101. In all of the examples shown in FIGS. 6A to 6C, the imaging element 101 is constituted by a substrate 603 including a photoelectric conversion unit having sensitivity to visible light and a substrate 604 including a photoelectric conversion unit having sensitivity to infrared light. A signal line and/or a power line connect the substrate 603 and the substrate 604 to each other, and the imaging element 101 operates as an integrated imaging element during a shutter operation period or during generation of an image signal.

For each pixel 21 in the imaging region 20, the imaging element 101 includes the substrate 603 including a photoelectric conversion unit 601 having sensitivity to visible light and the substrate 604 including a photoelectric conversion unit 602 having sensitivity to infrared light. The substrate 603 is arranged on a front surface side and the substrate 604 is arranged below the substrate 603. A color filter which transmits a specific wavelength is arranged above the photoelectric conversion unit 601 and the photoelectric conversion unit 602. The color filter has transmission characteristics with respect to infrared light in addition to visible light in a similar manner to the configurations shown in FIGS. 5A to 5C. In addition, in a similar manner to the configurations shown in FIGS. 5A to 5C, the photoelectric conversion unit 602 is capable of detecting infrared light because visible light attenuates before reaching the photoelectric conversion unit 602 in the process of propagating through the color filter and the photoelectric conversion unit 601.

The example shown in FIG. 6A includes a color filter that transmits blue (B), green (G), and red (R) as visible light. The example shown in FIG. 6B includes a color filter that transmits cyan (Cy), yellow (Y), and magenta (M) as visible light. The example shown in FIG. 6C includes a color filter that transmits white (W) as visible light.

In the modifications shown in FIGS. 5A to 5C and FIGS. 6A to 6C, the imaging element 101 includes a first pixel group including photoelectric conversion units having sensitivity to visible light and a second pixel group including photoelectric conversion units having sensitivity to infrared light over an entire surface of the imaging region 20. Therefore, visible light images and infrared images can be acquired with high definition.

Processing Procedure of Imaging Signal in First Embodiment

Figure 7:
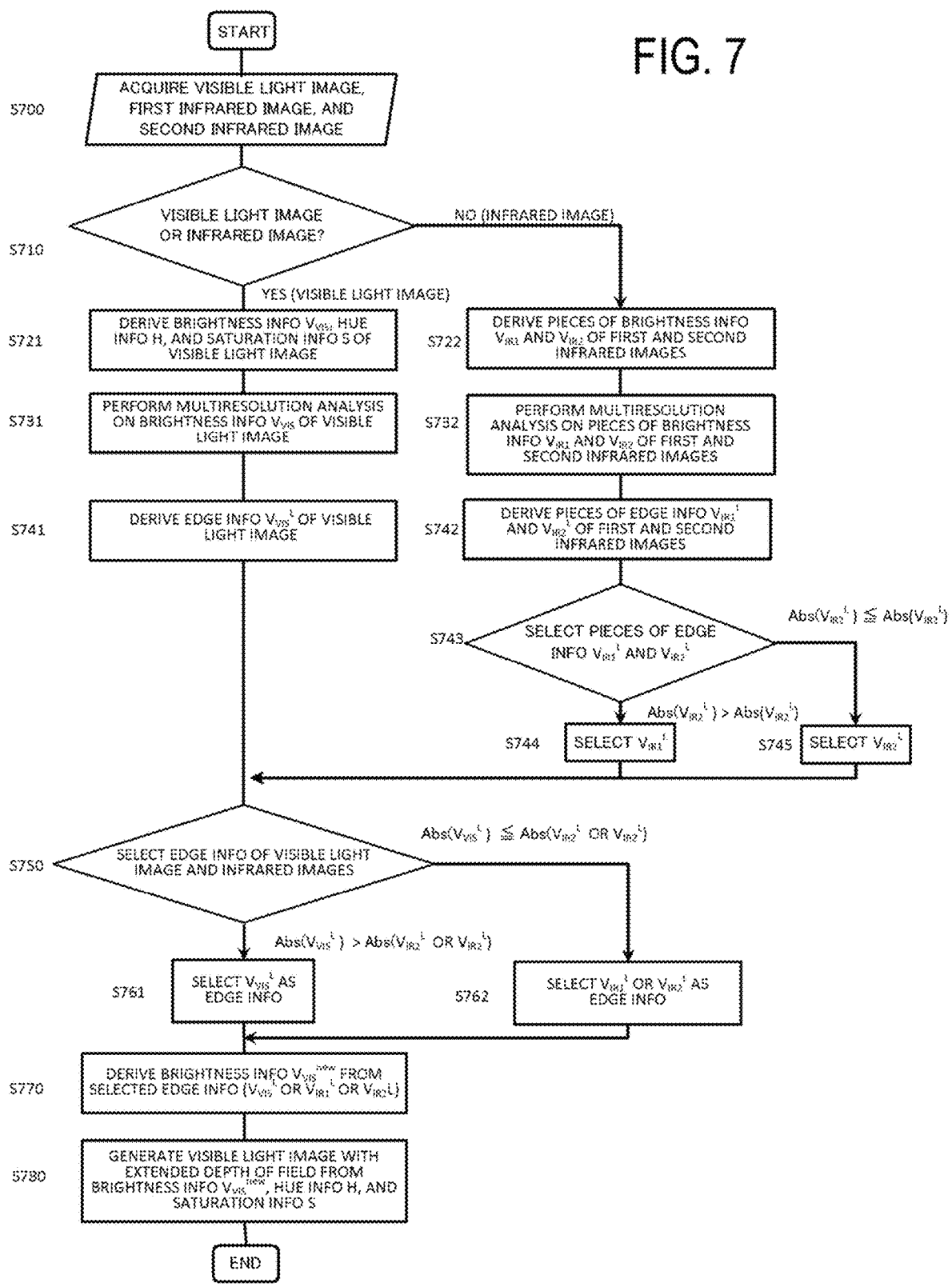
FIG. 7 shows an image processing procedure according to the first embodiment.

FIG. 7 is a flow chart showing an image processing procedure of the imaging apparatus 100 according to the present embodiment. The image processing procedure will now be described with reference to FIG. 7 using an example of a configuration in which the imaging apparatus 100 includes the first imaging element 101 shown in FIG. 4A and the second imaging element 102 shown in FIG. 4D.

When the imaging apparatus 100 (FIGS. 1A and 1B) starts operation, in step S700, the imaging apparatus 100 acquires a visible light image signal focused on a distance of $L_2$ from the imaging apparatus 100, a first infrared image signal focused on a distance of $L_1$ from the imaging apparatus 100, and a second infrared image signal focused on a distance of $L_3$ from the imaging apparatus 100. In this case, $L_1$, $L_2$, and $L_3$ have the relationship of $L_1 < L_2 < L_3$.

More specifically, a visible light luminous flux emitted from the subject 113 separated from the imaging apparatus 100 by a distance of $L_2$ passes through a pupil of the lens 103, comes into focus on the visible light photoelectric conversion unit of the imaging element 101, and the imaging element 101 outputs a visible light image signal. In addition, an infrared luminous flux emitted from the subject 112 separated from the imaging apparatus 100 by a distance of $L_1$ passes through the pupil of the lens 103, comes into focus on the infrared photoelectric conversion unit of the imaging element 101, and the imaging element 101 outputs a first infrared image signal. Furthermore, an infrared luminous flux emitted from the subject 114 separated from the imaging apparatus 100 by a distance of $L_3$ passes through the pupil of the lens 103, comes into focus on the infrared photoelectric conversion unit of the imaging element 102, and the imaging element 102 outputs a second infrared image signal.

With the lens 103, in-focus distances between a subject and the imaging apparatus, and focal lengths at wavelengths in a range of visible light and in a range of near infrared light are different from each other. In addition, with respect to the imaging elements 101 and 102, by mutually displacing the in-focus distances between a subject and the imaging apparatus, and the in-focus positions of the imaging elements in the imaging apparatus at wavelengths in a range of near infrared light, the imaging elements 101 and 102 can acquire image information with respect to a plurality of distances between a subject and the imaging apparatus at the wavelengths in the range of near infrared light.

Operations for acquiring the visible light image signal and the first infrared image signal output from the imaging element 101 and the second infrared image signal output from the imaging element 102 are synchronized by the imaging control unit 105. The preprocessing units 106a and 106b acquire image signals from the imaging elements 101 and 102, subject the image signals to preprocessing such as analog-digital signal conversion, horizontal/vertical synchronization and encoding, and transmit the preprocessed signals to the image processing unit 107 as image signals.

The image processing unit 107 acquires the visible light image signal and the first infrared image signal from the preprocessing unit 106a and acquires the second infrared image signal from the preprocessing unit 106b. The image processing unit 107 which acquires these image signals corresponds to a first acquisition unit or an acquisition unit.

In step S710, the image processing unit 107 separates visible light images and infrared images. The image processing unit 107 applies processes of step S721 and thereafter to visible light images and applies processes of step S722 and thereafter to infrared images.

In step S721, the image processing unit 107 converts a visible light image in an RGB color coordinate system to image information in an HSV color coordinate system and extracts brightness information $V_{VIS}$, hue information H, and saturation information S of the visible light image. The image processing unit 107 executing step S721 and step S722 (to be described later) corresponds to a first acquisition unit or an extraction unit.

Next, in step S731, the image processing unit 107 applies multiresolution analysis to the brightness information $V_{VIS}$ of the visible light image. Subsequently, in step S741, the image processing unit 107 performs a Laplacian operation based on the multiresolution analysis data of the brightness information $V_{VIS}$ to obtain edge information $V_{VIS}^L$. FIGS. 8A and 8B are diagrams illustrating a multiresolution analyzing process of brightness information V and a deriving process of edge information $V^L$ of an image.

First, the multiresolution analyzing process S731 of brightness information V will be described with reference to FIG. 8A. Assuming that the number of pixels in the imaging element 101 shown in FIG. 4A is Y-number of vertical pixels×X-number of horizontal pixels, the number of pixels in data of three primary colors of the visible light image is Y/2-number of vertical pixels×X/2-number of horizontal pixels. The image processing unit 107 acquires image data constituted by the Y/2=$Y_0$ and X/2=$X_0$ pieces of data as original image data $G_0$ (S810).

Next, in step S811, the image processing unit 107 integrates the original image data $G_0$ ($Y_0$-number of vertical and $X_0$-number of horizontal pieces of data) with pieces of data vertically and horizontally adjacent thereto to reduce the number of pieces of data by half ($Y_0/2$-number of vertical and $X_0/2$-number of horizontal pieces of data). The integration of data can be performed by averaging or obtaining a geometric mean of pieces of data that are adjacent to each other or by selecting one of the adjacent pieces of data. Next, in step S812, the image processing unit 107 extracts (subsamples) data both vertically and horizontally at a rate of one sample decimated for every two samples from the data ($Y_0/2$-number of vertical and $X_0/2$-number of horizontal pieces of data) of step S811. In step S813, the image processing unit 107 acquires the extracted image data as $G_1$. The image processing unit 107 repeats the steps of S811 to S813 (a loop which returns to S811 after S814 and then proceeds until reaching S814) n-number of times. In this manner, based on the original image $G_0$, the image processing unit 107 derives a Gaussian image pyramid $G_i=\{G_0, G_1, G_2, \ldots, G_n\}$ constituted by $G_1, G_2, \ldots, G_n$ (S815).

Next, the deriving process S741 of edge information $V^L$ will be described with reference to FIG. 8B. The image processing unit 107 obtains a Gaussian image $G_n$ from the Gaussian image pyramid $G_i=\{G_0, G_1, G_2, \ldots, G_n\}$ (S820), and expands the Gaussian image $G_n$ both vertically and horizontally by a factor of two (S821). Next, in step S822, the image processing unit 107 obtains an image by subtracting a Gaussian image $G_{n-1}$ from the two-fold expanded image of $G_n$ created in step S821. In step S823, the image processing unit 107 acquires the extracted image data as a Laplacian image $L_{n-1}$. The image processing unit 107 repeats the steps of S821 to S823 (a loop which returns to S821 after S824 and then proceeds until reaching S824) n-number of times. In this manner, a Laplacian image pyramid $L_{i-1}=\{L_{n-1}, L_{n-2}, \ldots, L_0\}$ is obtained based on the image $G_i$. Each Laplacian image $L_i$ represents an edge component of a specific frequency. The image processing unit 107 obtains the edge information $V_{VIS}^L$ based on the Laplacian image pyramid $L_{i-1}$.

It should be noted that an acquisition method of the edge information $V^L$ is not limited to the method described above which uses a Laplacian pyramid and any known method may be used instead.

On the other hand, while an infrared image separated in step S710 is converted in step S722 to image information in an HSV color space in a similar manner to step S721, since the infrared image does not include hue and saturation information, only brightness information is extracted. Hereinafter, the pieces of brightness information extracted from the first infrared image and the second infrared image will be respectively referred to as $V_{IR1}$ and $V_{IR2}$. $V_{IR1}$ and $V_{IR2}$ respectively correspond to first infrared brightness information and second infrared brightness information.

Next, in step S732, the image processing unit 107 applies multiresolution analysis to the pieces of brightness information $V_{IR1}$ and $V_{IR2}$ of the infrared images. Subsequently, in step S742, the image processing unit 107 performs a Laplacian operation based on the multiresolution analysis data of the pieces of brightness information $V_{IR1}$ and $V_{IR2}$ to obtain pieces of edge information $V_{IR1}^L$ and $V_{IR2}^L$.

The multiresolution analyzing process of step S732 and the edge information deriving process of step S742 are basically similar to the processes of steps S731 and S741 described using FIGS. 8A and 8B. However, while the number of pixels of the first infrared image obtained from the imaging element 101 shown in FIG. 4A is Y/2-number of vertical pixels×X/2-number of horizontal pixels, the number of pixels of the second infrared image obtained from the imaging element 102 shown in FIG. 4D is Y-number of vertical pixels×X-number of horizontal pixels. Therefore, in step S810, with respect to the first infrared image, original image data constituted by Y/2=$Y_0$-number of vertical and X/2=$X_0$-number of horizontal pieces of data is determined as $G_{0(IR1)}$. On the other hand, with respect to the second infrared image, integration of both vertically and horizontally adjacent data is performed and image data constituted by Y/2=$Y_0$-number of vertical and X/2=$X_0$-number of horizontal pieces of data is determined as $G_{0(IR2)}$. Since processes of step S811 and thereafter are similar to those described above, a description of the processes will be omitted.

Returning to FIG. 7, processes after extracting the pieces of edge information $V^L$, $V_{IR1}^L$, and $V_{IR2}^L$ will now be described.

First, in step S743, the image processing unit 107 compares magnitudes of absolute values of $V_{IR1}^L$ and $V_{IR2}^L$ and selects the larger edge information value. In other words, when an edge strength of the first infrared image is greater, in step S744, the image processing unit 107 selects $V_{IR1}^L$ as the edge information $V_{IR}^L$ of the infrared image. On the other hand, when an edge strength of the second infrared image is greater, in step S745, the image processing unit 107 selects $V_{IR2}^L$ as the edge information $V_{IR}^L$ of the infrared image. The selection process of steps S743 to S745 may be individually performed for each partial region of the infrared image.

Once step S741 and step S744 or S745 are finished, the edge information $V_{VIS}^L$ of the visible light image and the edge information $V_{IR}^L$ of the infrared image will have been obtained.

Next, in step S750, the image processing unit 107 determines which of the pieces of edge information of the visible light image and the infrared image with respect to a pixel of interest is clear. In other words, the image processing unit 107 compares an absolute value Abs ($V_{VIS}^L$) of the edge information of the visible light image with an absolute value Abs ($V_{IR}^L$) of the edge information of the infrared image. When the absolute value Abs ($V_{VIS}^L$) of the edge information of the visible light image is larger than the absolute value Abs ($V_{IR}^L$) of the edge information of the infrared image, the image processing unit 107 considers $V_{VIS}^L$ to be clear edge information (step S761). On the other hand, when the absolute value Abs ($V_{VIS}^L$) of the edge information of the visible light image is equal to or smaller than the absolute value Abs ($V_{IR}^L$) of the edge information of the infrared image, the image processing unit 107 considers $V_{IR}^L$ to be clear edge information (step S762).

While the absolute value Abs ($V_{VIS}^L$) and the absolute value Abs ($V_{IR}^L$) of the pieces of edge information are compared with each other in the present example, edge information may be selected by focusing on pieces of edge information of a specific resolution such as pieces of edge information of a visible light image and an infrared image of a level Ln of a Laplacian image pyramid. In this case, as edge information of another resolution, edge information of an image selected among a visible light image and an infrared image may be used or composite edge information of the visible light image and the infrared image may be used.

Once step S761 or S762 is finished, clearer edge information will have been selected by comparing the visible light image and the infrared image with each other. Therefore, in step S770, the image processing unit 107 derives (determines) brightness information $V_{VIS}^{new}$ based on the selected clearer edge information. The image processing unit 107 which determines the brightness information $V_{VIS}^{new}$ (third brightness information) of an image having clear edge information by the processes of steps S731 to S762 corresponds to a third acquisition unit or a determining unit.

Finally, in step S780, the image processing unit 107 generates a visible light image with an extended depth of field using the brightness information $V_{VIS}^{new}$ obtained in step S770 and the hue information H and the saturation information S derived in step S721 described earlier. The image processing unit 107 which generates a visible light image (a second visible light image) with an extended depth of field by the process of step S780 corresponds to a generation unit.

This concludes the description of an imaging signal processing method and a configuration of an imaging apparatus for obtaining a visible light image with an extended depth of field based on a visible light image and an infrared image.

Advantageous Effects of Embodiment

According to the present embodiment, in addition to image information of an in-focus distance region at wavelengths in a range of visible light, contour (edge) and/or brightness difference information in an out-of-focus distance region at wavelengths in the range of visible light is compensated by infrared image information having an in-focus distance region which is different from that at wavelengths in the range of visible light. As a result, a visible light image of which a depth of field has been extended beyond a distance between a subject and an imaging apparatus which comes into focus at wavelengths in the range of visible light is obtained while maintaining synchronism.

In conventional art which superimposes visible light images with a plurality of in-focus distance regions, a decline in image contrast and blurring of subject contours are observed due to the superposition of an out-of-focus image around an in-focus image. In contrast, in the present embodiment, since whichever of the pieces of edge information of a visible light image and an infrared image is clearer is selected and used, a decline in contrast or blurring of contours does not occur as was the case in conventional art.

Furthermore, since characteristics of infrared light include higher transmittivity with respect to fog and haze than visible light and an enhanced contrast ratio between the sky and clouds, infrared light is favorable for acquiring image information during remote monitoring. In addition, since infrared light has a high reflectance with respect to plants and human skin, infrared light is suitable for distinguishing between living organisms and artificial objects regardless of a subject distance. Therefore, the present embodiment is also favorable for monitoring a wide area with high definition while maintaining synchronism at any time of day or night.

Second Embodiment

Figure 9:
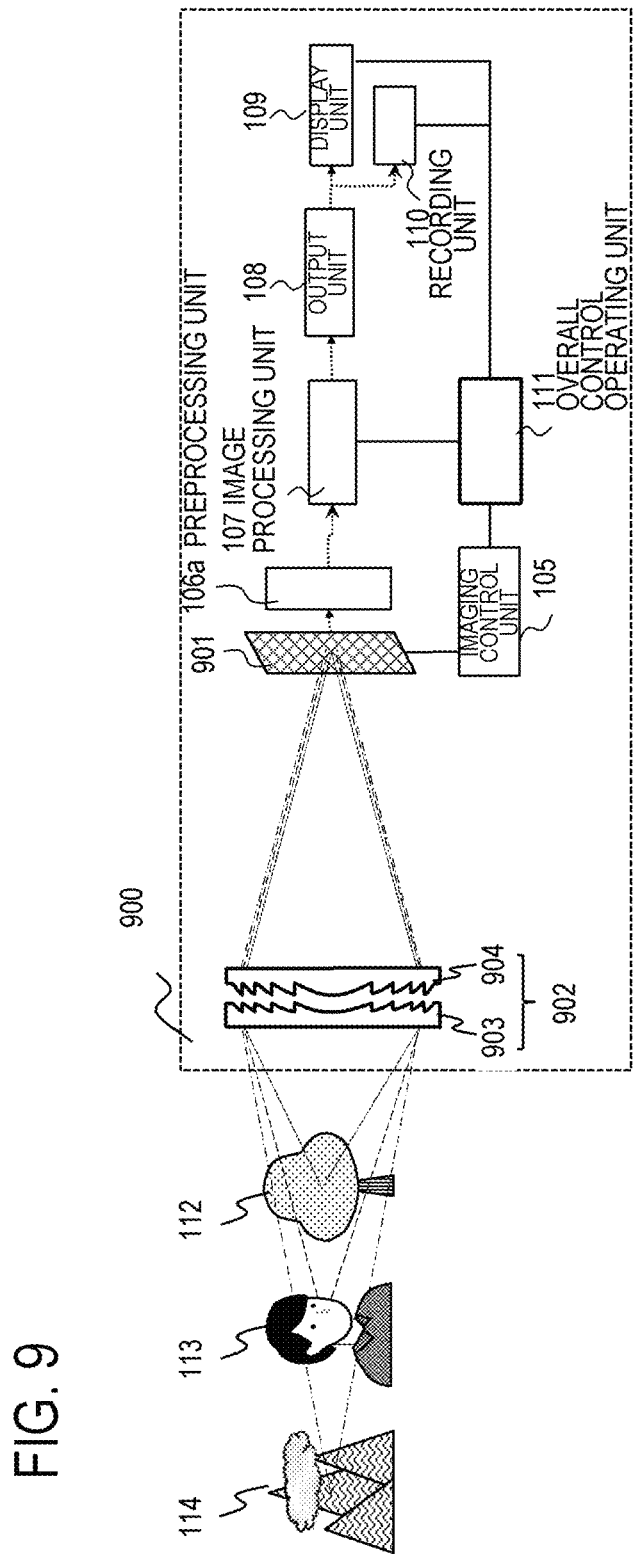
FIG. 9 shows a configuration diagram of an imaging apparatus according to a second embodiment.

FIG. 9 is a block diagram showing another example of an imaging apparatus according to the present embodiment.

In FIG. 9, an imaging apparatus 900 includes an imaging element 901 and an imaging lens 902. In addition, reference numerals 106 to 111 included in the imaging apparatus 900 fulfill the same names and roles as the same reference numerals in FIGS. 1A and 1B. The subject 112 represents near distance, the subject 113 represents middle distance, and the subject 114 represents far distance.

The imaging element 901 is similar in configuration to the first imaging element 101 in the first embodiment (FIGS. 1A and 1B) and both a photoelectric conversion unit having sensitivity to visible light and a photoelectric conversion unit having sensitivity to infrared light are included in the imaging element 901. In other words, the imaging element 901 may be configured as shown in FIG. 2 and FIGS. 3A to 3D. In addition, the photoelectric conversion units having sensitivity to visible light and infrared light in the imaging element 901 may adopt any of the arrangements shown in FIGS. 4A to 4C, FIGS. 5A to 5C, and FIGS. 6A to 6C.

<Description of Imaging Lens 902>

The imaging lens 902 is constituted by a lens group including a diffractive optical element. In addition, the diffractive optical element included in the imaging lens 902 includes two diffractive optical elements of different types. Specifically, the diffractive optical element is constituted by a so-called stratified volume diffractive optical element in which a concave lens 903 having a negative focal length and a convex lens 904 having a positive focal length are stacked on top of each other.

Figures 10A, 10B:
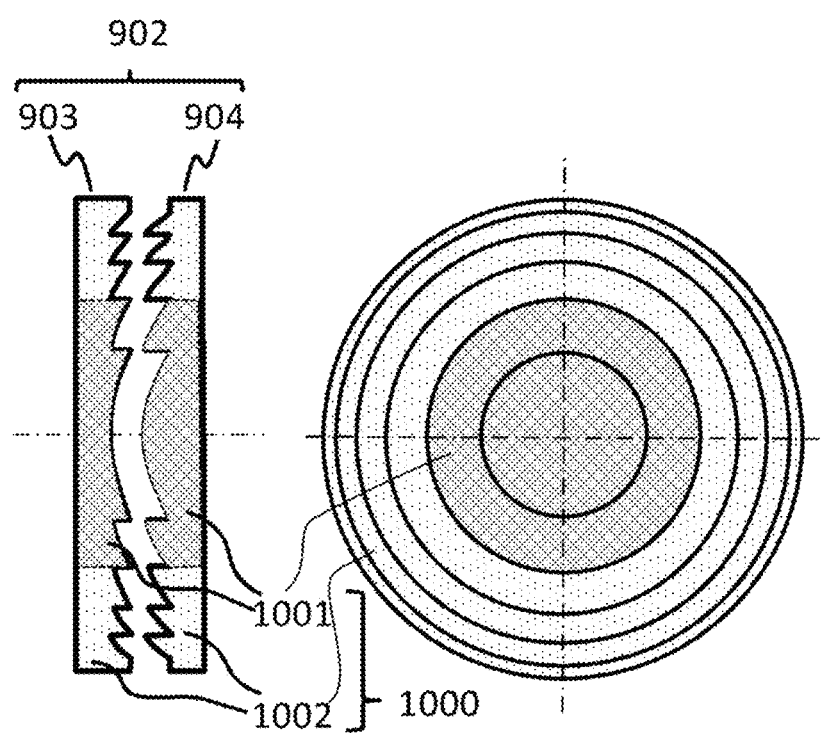
FIGS. 10A and 10B show schematic views of a diffractive lens used in the embodiment.

FIGS. 10A and 10B are, respectively, a sectional view and a front view of a stratified volume diffractive optical element. Reference numerals 903 and 904 in FIGS. 10A and 10B fulfill the same roles as the members with the same reference numerals in FIG. 9.

Figure 11:
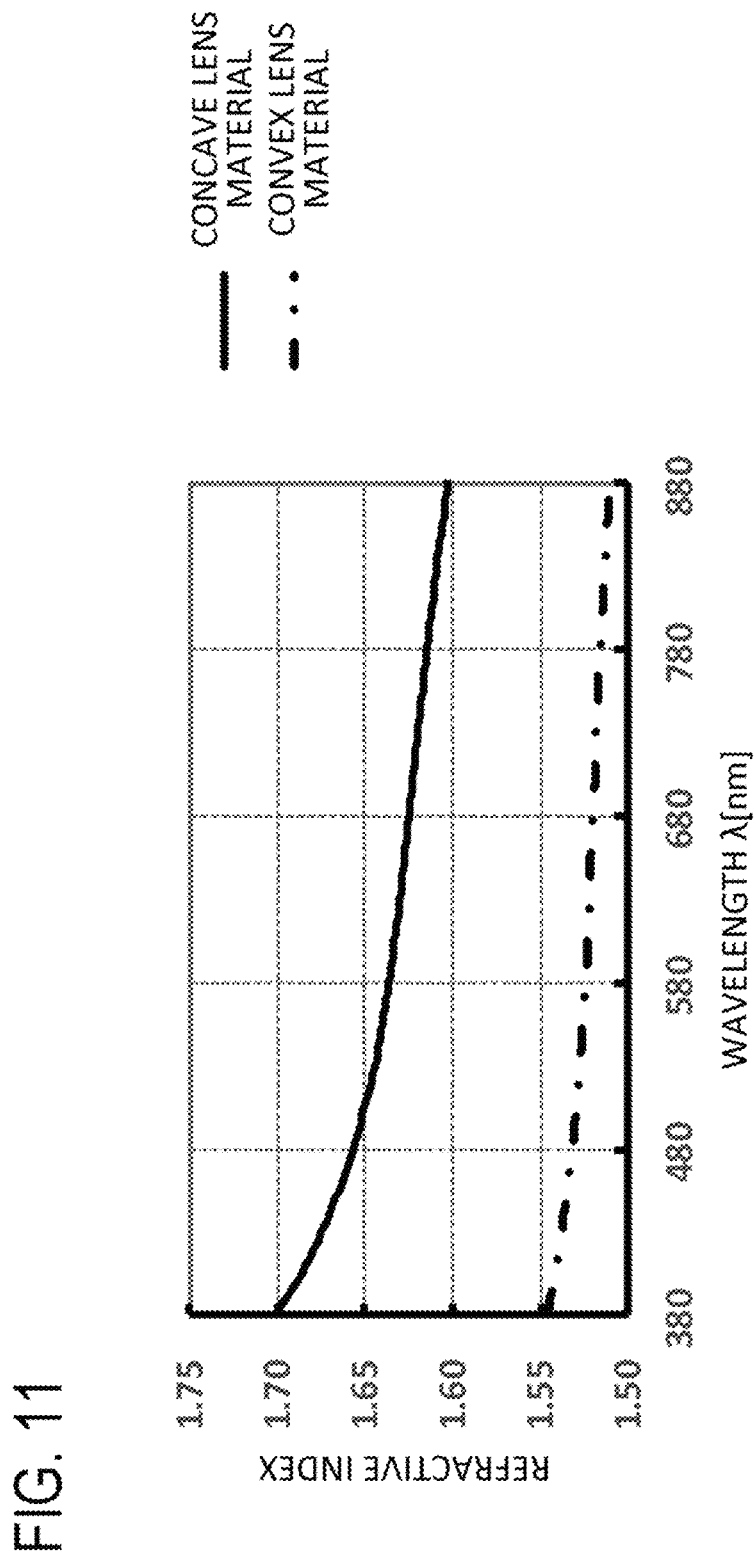
FIG. 11 shows an example of refractive index/wavelength dispersion characteristics of diffractive lens materials.

The diffractive optical elements 903 and 904 may respectively use materials with different refractive index/wavelength dispersion characteristics. FIG. 11 represents refractive index/wavelength dispersion characteristics of lens materials used in the diffractive optical elements 903 and 904. In the present example, a polycarbonate-based resin is used as the material of the diffractive optical element 903 and an acrylate-based resin is used as the material of the diffractive optical element 904.

Figure 12A:
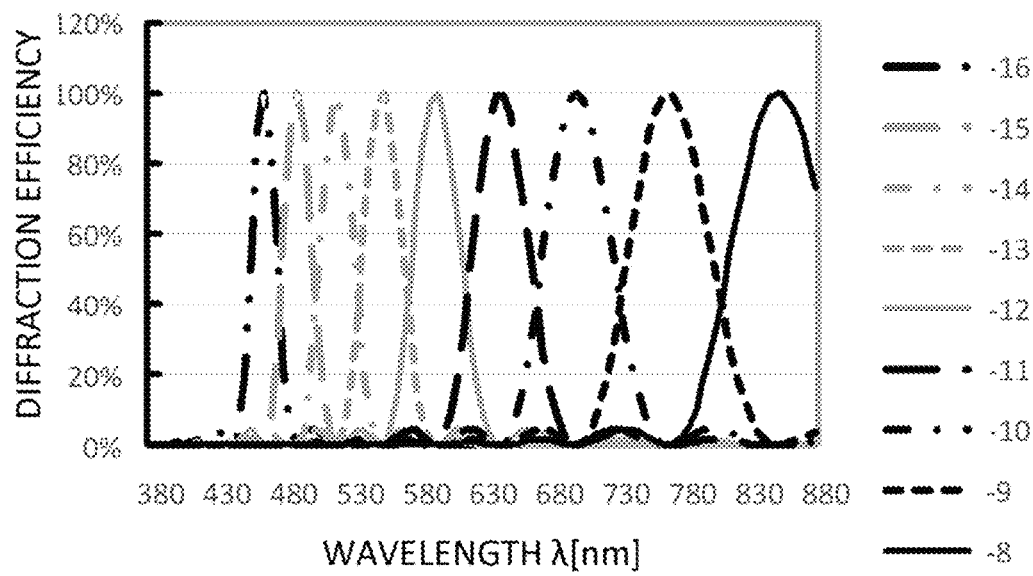
FIGS. 12A and 12B show an example of incident wavelength dependence of high order diffraction efficiency of a diffractive lens.
Figure 12B:
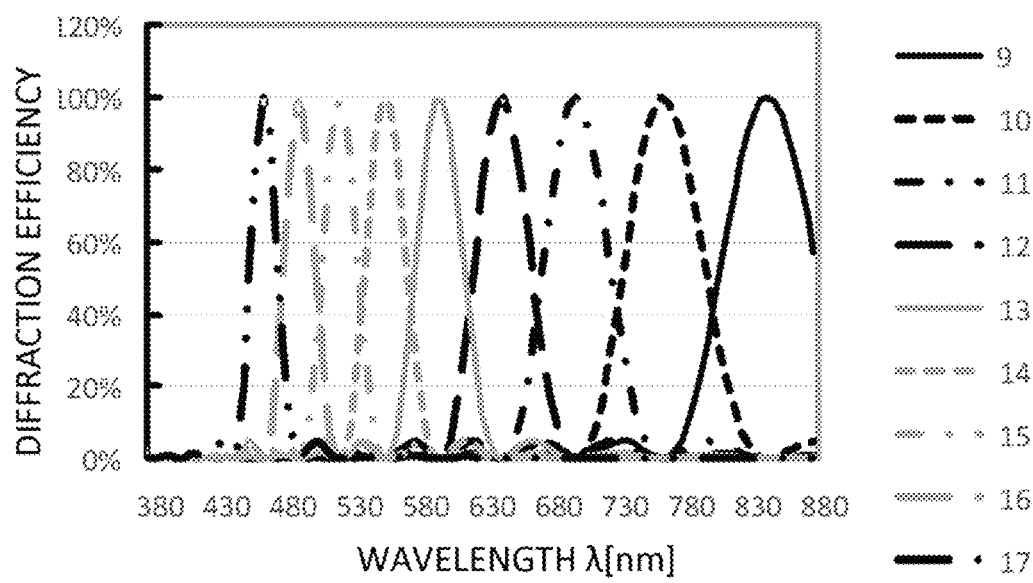

The diffractive optical elements 903 and 904 are so-called transmissive relief (film thickness-modulated) diffractive optical elements with engraved saw blade-shaped diffraction gratings. High diffraction efficiency is obtained by applying concentric blazed gratings to a periodic shape of a lens surface from an optical axis of the lens toward a periphery of the lens such that, when m denotes a diffraction order and p denotes a blazing order, m=p. FIGS. 12A and 12B show wavelength dependence of diffraction efficiency of $m^{th}$-order diffracted light in a diffractive optical element subjected to blazed grating of m=p using the materials shown in FIG. 11. FIG. 12A shows a design example of the concave lens diffractive optical element 903 and FIG. 12B shows a design example of the convex lens diffractive optical element 904. In the respective examples, design values for the concave lens diffractive optical element 903 (FIG. 12A) are m=p=−9 and a diffraction wavelength λ=700 nm at the order described above, and design values for the convex lens diffractive optical element 904 (FIG. 12B) are m=p=10 and a diffraction wavelength λ=700 nm at the order described above. In both the concave lens and the convex lens, a peak of diffraction efficiency is observed in an integer order ($m^{th}$-order) at wavelength from in the range of visible light to in the range of near infrared light. In addition, a summation of orders of which wavelengths with peak diffraction efficiency are closest to one another produces a sum of orders of +1. In other words, when a sum of diffraction orders for each wavelength can be considered +1, a diffractive optical element created by stacking diffractive optical elements of positive and negative diffraction orders subjected to blazed grating of m=p functions as a diffractive optical element which outputs +1 order diffracted light with respect to incidence of 0 order light. Furthermore, as shown in FIG. 13, diffraction efficiency of a stratified volume diffractive optical element which outputs +1 order diffracted light with respect to incidence of 0 order light exhibits high primary diffraction efficiency from at wavelengths in the range of visible light to in the range of near infrared light.

In FIGS. 10A and 10B, reference numeral 1000 denotes an entire region of a lens pupil, reference numeral 1001 denotes a lens pupil region (first region) in a vicinity of a lens optical axis, and reference numeral 1002 denotes a lens pupil region (second region) on a side of a lens periphery. The entire lens pupil region 1000 of the imaging lens 902 is divided into the region 1001 including the lens optical axis and the lens region 1002 that is a region outside of the lens region 1001. In the range of visible light, the imaging lens 902 according to the present example focuses on an imaging element at a distance $L_2$ that separates a subject from the imaging apparatus with respect to a luminous flux incident to the entire lens pupil region 1000. In addition, in the range of infrared light, the imaging lens 902 according to the present example focuses on an imaging element at a distance $L_3$ that separates a subject from the imaging apparatus with respect to a luminous flux incident to the lens pupil region 1001 in the vicinity of the lens optical axis and at a distance $L_1$ that separates a subject from the imaging apparatus with respect to a luminous flux incident to the lens pupil region 1002 on the lens periphery side. In this case, distances $L_1$ and $L_3$ are ranges of in-focus distances that do not overlap with each other. Furthermore, while ranges of the in-focus distances $L_1$ and $L_2$ or ranges of the distances $L_2$ and $L_3$ between a subject and the imaging apparatus may partially overlap with each other, $L_1$, $L_2$, and $L_3$ preferably represent mutually different distance ranges from the perspective of expanding an in-focus distance region in a visible light image.

Figure 14:
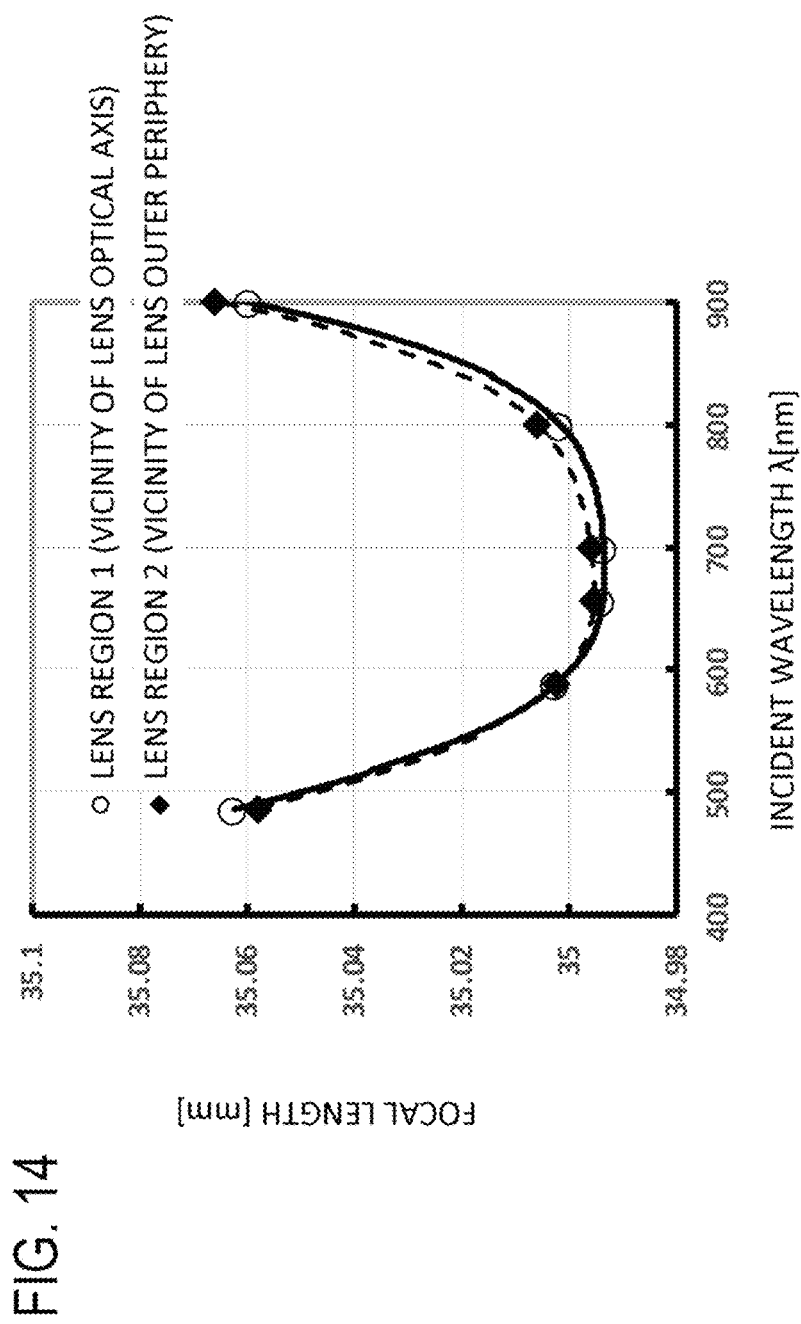
FIG. 14 shows incident wavelength dependence of an on-optical axis focal length of a diffractive lens.

FIG. 14 shows incident wavelength dependence of a focal length of the imaging lens 902. In this case, the in-focus distance $L_2$ between a subject and the imaging apparatus at wavelengths in the range of visible light is 500 m, the in-focus distance $L_3$ between a subject and the imaging apparatus in the lens pupil region 1001 in the vicinity of the lens optical axis at wavelengths in the range of infrared light is 800 m, and the in-focus distance $L_1$ between a subject and the imaging apparatus in the lens pupil region 1002 on the lens periphery side at wavelengths in the range of infrared light is 300 m. A design wavelength of light in the range of visible light is the sodium d line (λ=587.56 nm) and a design wavelength of light in the range of infrared light is λ=800 nm. In addition, a focal length at wavelengths in the range of visible light is f=35.0000 mm, a focal length in the lens pupil region 1001 in the vicinity of the lens optical axis at wavelengths in the range of infrared light is f=35.0025 mm, a focal length in the lens pupil region 1002 on the lens periphery side at wavelengths in the range of infrared light is f=35.0015 mm, and the F value is 1.4.

While the number of divisions into lens pupil regions with different in-focus distance regions at wavelengths in the range of infrared light in the present example is two, the number of divisions into lens pupil regions may be increased in accordance with the number of desired in-focus distance regions.

An imaging lens including a diffractive optical element in this manner is capable of pluralizing in-focus distance regions between a subject and the imaging apparatus at wavelengths in the range of infrared light while suppressing chromatic aberration at wavelengths in the range of visible light.

In addition, the imaging lens 902 is capable of pluralizing in-focus distance regions between a subject and the imaging apparatus at wavelengths in the range of infrared light by suppressing halos and glares due to high order diffracted light at wavelengths in the range of visible light. This is because the diffractive optical element included in the imaging lens 902 is constructed by stacking a plurality of diffractive optical elements which have different materials, positive and negative focal lengths, or positive and negative design diffraction orders.

In addition, when a lens pupil diameter is extended to a lens periphery portion, the in-focus distance range between a subject and the imaging apparatus becomes deeper when farther than an in-focus point and shallower when closer than the in-focus point. Therefore, the in-focus distance $L_1$ between a subject and the imaging apparatus of an infrared flux incident to the lens periphery portion is preferably shorter than the in-focus distance $L_3$ between a subject and the imaging apparatus of an infrared flux incident to the vicinity of the lens optical axis because the lens pupil diameter is extended and an increased incident light amount to the lens can be utilized effectively.

Processing Procedure of Imaging Signal in Second Embodiment

Figure 15:
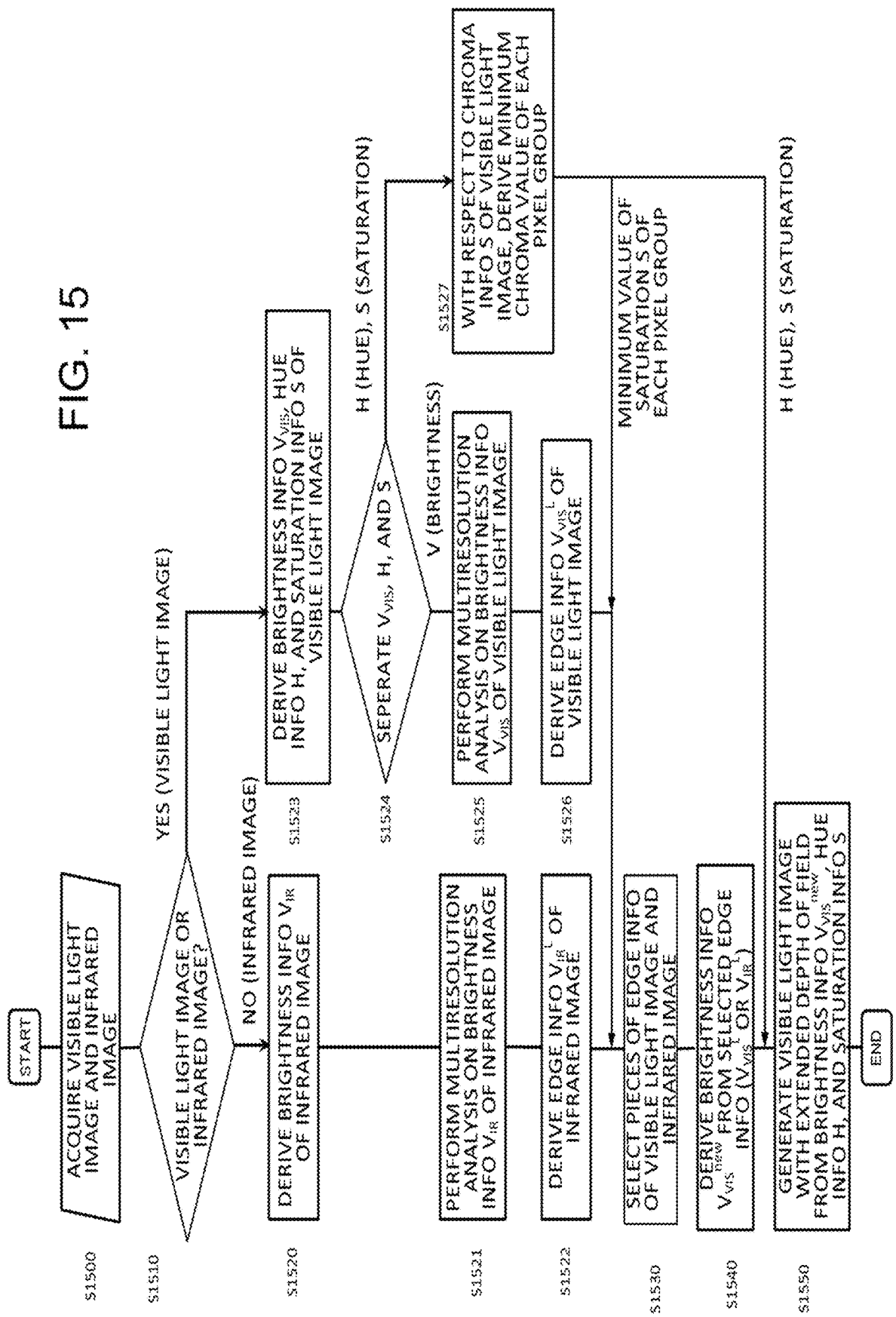
FIG. 15 shows an image processing procedure according to the second embodiment.

FIG. 15 is a flow chart showing an image processing procedure of the imaging apparatus 900 according to the present embodiment. The image processing procedure will now be described with reference to FIG. 15 using an example of a configuration in which the imaging apparatus 900 includes the imaging element 901 corresponding to the imaging element 101 shown in FIG. 4A.

When the imaging apparatus 900 (FIG. 9) starts operation, in step S1500, the imaging apparatus 900 acquires a visible light image focused on a distance of $L_2$ from the imaging apparatus 900 and an infrared image in which infrared images focused on distances of $L_1$ and $L_3$ from the imaging apparatus 900 are superimposed on one another. The distances $L_1$, $L_2$, and $L_3$ have a relationship expressed as $L_1 < L_2 < L_3$ in a similar manner to the first embodiment.

More specifically, a visible light luminous flux emitted from the subject 113 separated from the imaging apparatus 900 by the distance $L_2$ passes through the entire lens pupil region 1000 of the imaging lens 902, comes into focus on the visible light photoelectric conversion unit of the imaging element 901, and the imaging element 901 outputs a visible light image signal. In addition, an infrared luminous flux emitted from the subject 114 separated from the imaging apparatus 900 by the distance $L_3$ passes through the lens pupil region 1001 in the vicinity of the optical axis of the imaging lens 902, comes into focus on the infrared photoelectric conversion unit of the imaging element 901, and the imaging element 901 outputs an infrared image signal. Furthermore, an infrared luminous flux emitted from the subject 112 separated from the imaging apparatus 900 by the distance $L_1$ passes through the lens pupil region 1002 in the lens periphery portion of the imaging lens 902, comes into focus on the infrared photoelectric conversion unit of the imaging element 901, and the imaging element 901 outputs an infrared image signal.

That is, the infrared image output by the imaging element 901 is a superposition of an in-focus image of the subject 114 which passes through the lens pupil region 1001 and an in-focus image of the subject 112 which passes through the lens pupil region 1002. In other words, the infrared image output by the imaging element 901 according to the present embodiment corresponds to an image that is a summation of the first infrared image and the second infrared image according to the first embodiment.

At this point, an out-of-focus infrared luminous flux of the subject 112 which passes through the lens pupil region 1001 and an out-of-focus infrared luminous flux of the subject 114 which passes through the lens pupil region 1002 are also incident in a superimposed manner. However, since signal strengths of both out-of-focus infrared luminous fluxes are weaker than those of the in-focus infrared luminous fluxes, detection of edge information of the infrared image using the in-focus infrared luminous fluxes is not impeded.

The preprocessing unit 106 acquires an image signal from the imaging element 901, subjects the image signal to preprocessing such as analog-digital signal conversion, horizontal/vertical synchronization and encoding, and transmits the preprocessed signal to the image processing unit 107 as an image signal. The image processing unit 107 acquires the visible light image signal and the infrared image signal from the preprocessing unit 106. The image processing unit 107 which acquires these image signals corresponds to an acquisition unit.

In step S1510, the image processing unit 107 separates visible light images and infrared images. The image processing unit 107 applies processes of step S1523 and thereafter to visible light images and applies processes of steps S1520, S1521 and S1522 to infrared images.

In step S1523, the image processing unit 107 converts a visible light image in an RGB color coordinate system to image information in an HSV color coordinate system and extracts brightness information $V_{VIS}$, hue information H, and saturation information S of the visible light image. The image processing unit 107 which executes step S1523 and step S1520 (to be described later) corresponds to an extraction unit.

In subsequent step S1524, the image processing unit 107 separates the brightness information $V_{VIS}$, the hue information H, and the saturation information S. In step S1525, the image processing unit 107 performs a multiresolution analysis on the brightness information $V_{VIS}$ of the visible light image and, in step S1526, performs a Laplacian operation based on the multiresolution analysis data of $V_{VIS}$ to obtain edge information $V_{VIS}^L$.

Step S1527 is a process of deriving information to be used to determine pieces of edge information of the visible light image and the infrared image in S1530 to be described later. In step S1527, with respect to the saturation information S ($Y_0$-number of vertical and $X_0$-number of horizontal pieces of data) obtained based on the original image data $G_0$, the image processing unit 107 determines sections constituted by several pixel groups and derives a lowest saturation value of pixels in each section as a minimum saturation value $S_{min}$ in each section. While the minimum saturation value $S_{min}$ is to be used in the determination process of S1530 to be described later, depending on a determination method, the minimum saturation value $S_{min}$ is not used. Therefore, when the minimum saturation value $S_{min}$ is not used in the determination method of S1530, step S1527 may be omitted.

On the other hand, the infrared image in the present embodiment corresponds to an image that is a summation of the first infrared image and the second infrared image in the first embodiment. In other words, an infrared image according to the present embodiment is an image obtained from an out-of-focus infrared luminous flux of the subject 112 and an in-focus infrared luminous flux of the subject 114 and from an out-of-focus infrared luminous flux of the subject 114 and an in-focus infrared luminous flux of the subject 112. The out-of-focus infrared luminous flux of the subject 112 and the in-focus infrared luminous flux of the subject 114 pass through the lens pupil region 1001 in the vicinity of the lens optical axis and are incident to the infrared photoelectric conversion unit of the imaging element 901. The out-of-focus infrared luminous flux of the subject 114 and the in-focus infrared luminous flux of the subject 112 pass through the lens pupil region 1002 in the lens periphery portion and are incident to the infrared photoelectric conversion unit of the imaging element 901. Subsequently, an infrared image based on the in-focus and out-of-focus infrared luminous fluxes is to be output from the imaging element 901.

In step S1520, the infrared image obtained as described above is converted into image information in an HSV color coordinate system by the image processing unit 107 and brightness information $V_{IR}$ of the infrared image is extracted. Therefore, infrared brightness information of the in-focus and out-of-focus images of the subject 112 and the subject 114 are superimposed on the brightness information $V_{IR}$ of the infrared image in the present embodiment. Furthermore, in step S1521, the brightness information $V_{IR}$ of the infrared image is subjected to a multiresolution analysis and, in step S1522, a Laplacian operation is performed based on the multiresolution analysis data of $V_{IR}$ to obtain edge information $V_{IR}^L$.

Since the multiresolution analysis in steps S1521 and S1525 and the Laplacian operation and edge information extraction in steps S1522 and S1526 have already been respectively described with reference to FIGS. 8A and 8B, repetitive descriptions thereof will be omitted.

Once steps S1522 and S1526 are finished, the edge information $V_{VIS}^L$ of the visible light image and the edge information $V_{IR}^L$ of the infrared image will have been obtained.

Figure 16B:
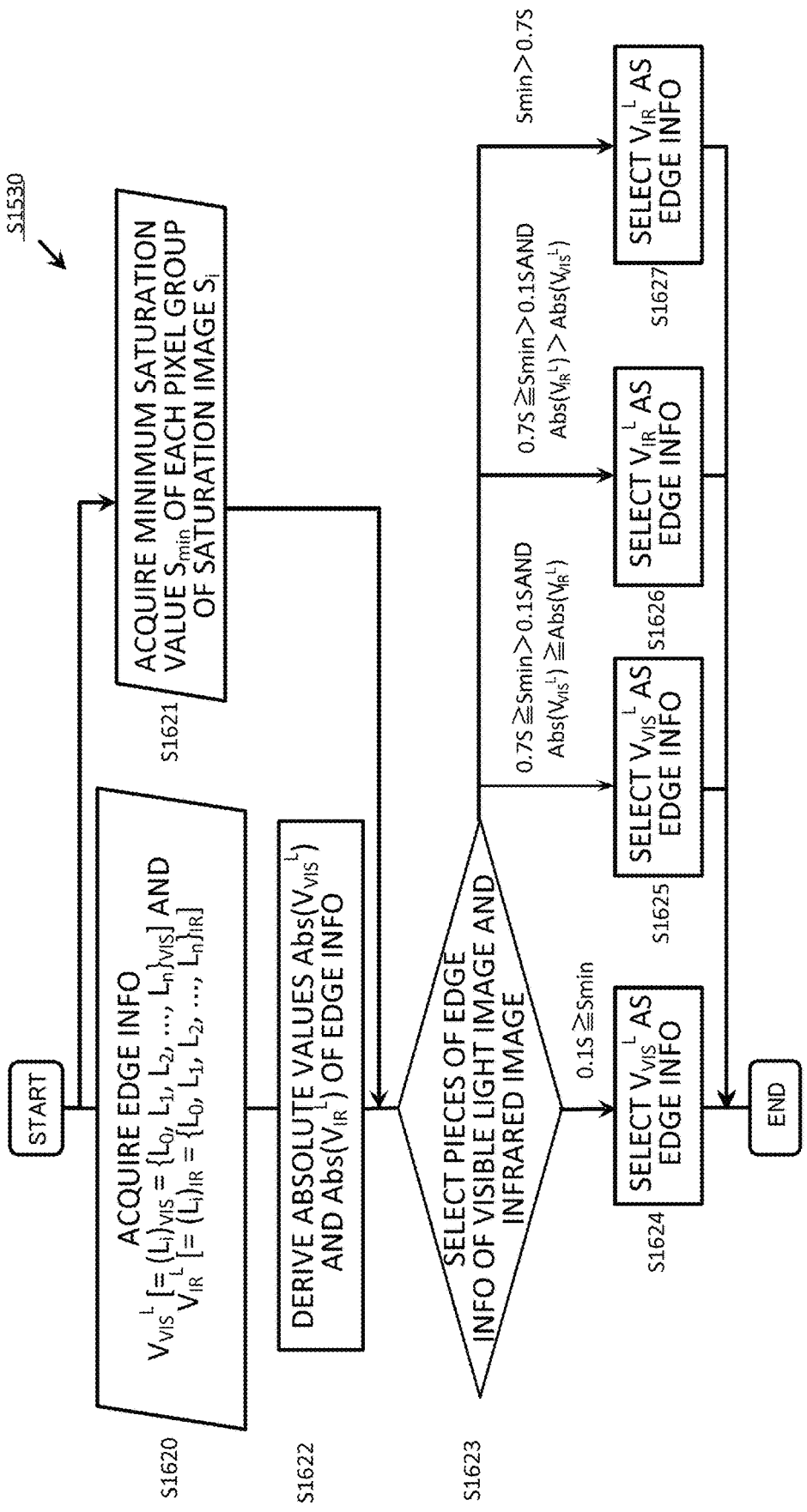

Next, in step S1530, the image processing unit 107 determines which of the pieces of edge information of the visible light image and the infrared image with respect to a pixel of interest is clear. FIGS. 16A and 16B are diagrams illustrating, in greater detail, two examples of the determination step S1530 of pieces of edge information $V^L$ of the visible light image and the infrared image.

FIG. 16A is a flow chart showing an example of implementation of the determination step S1530. The process shown in FIG. 16A represents a method which simply compares an absolute value Abs ($V_{VIS}^L$) of the edge information of the visible light image with an absolute value Abs ($V_{IR}^L$) of the edge information of the infrared image and considers whichever edge information with the larger absolute value to be clear edge information. In other words, the image processing unit 107 acquires edge information $V_{VIS}^L$ of the visible light image and the edge information $V_{IR}^L$ of the infrared image in step S1610, derives absolute values of $V_{VIS}^L$ and $V_{IR}^L$ in step S1611, and compares the absolute values of $V_{VIS}^L$ and $V_{IR}^L$ with each other in step S1612. When the absolute value Abs ($V_{VIS}^L$) of the edge information of the visible light image is larger than the absolute value Abs ($V_{IR}^L$) of the edge information of the infrared image, the image processing unit 107 proceeds to step S1613 and considers $V_{VIS}^L$ to be clear edge information. On the other hand, when the absolute value Abs ($V_{VIS}^L$) of the edge information of the visible light image is equal to or smaller than the absolute value Abs ($V_{IR}^L$) of the edge information of the infrared image, the image processing unit 107 proceeds to step S1614 and considers $V_{IR}^L$ to be clear edge information.

While the absolute value Abs ($V_{VIS}^L$) and the absolute value Abs ($V_{IR}^L$) of the pieces of edge information are compared with each other in the present example, edge information may be selected by focusing on pieces of edge information of a specific resolution such as pieces of edge information of a visible light image and an infrared image of a level Ln of a Laplacian image pyramid. In this case, as edge information of another resolution, edge information of an image selected among a visible light image and an infrared image may be used or composite edge information of the visible light image and the infrared image may be used.

FIG. 16B is a flow chart showing another example of implementation of the determination step S1530. The process shown in FIG. 16B represents a method of using the minimum saturation value $S_{min}$ obtained from a visible light image to select edge information. In this method, it is assumed that the visible light image is accompanied by blurring of visible light image contours and a rise in the minimum saturation value (achromatization of image) as scattering of visible light increases due to air, fog, or haze.

The image processing unit 107 acquires edge information in step S1620 and derives an absolute value of the edge information in step S1622. These processes are similar to steps S1610 and S1611 in FIG. 16A.

In step S1621, the image processing unit 107 acquires the minimum saturation value $S_{min}$. The minimum saturation value $S_{min}$ has been obtained in step S1527 by separating the saturation information S ($Y_0$-number of vertical and $X_0$-number of horizontal pieces of data) obtained from original image data $G_0$ ($Y_0$-number of vertical and $X_0$-number of horizontal pieces of data) and allocating the minimum saturation value $S_{min}$ for each pixel group. Specifically, for example, a pixel group made up of j-number of vertical pixels and k-number of horizontal pixels may be determined as a section, and for each section of j-number of pixels×k-number of pixels with respect to the original image data $G_0$, a minimum saturation value of the pixels in the section may be allocated as the minimum saturation value $S_{min}$ of the section. Alternatively, a multiresolution analysis for picking out the minimum saturation value $S_{min}$ of saturation data that is an object of integration is applied to saturation information S ($Y_0$-number of vertical and $X_0$-number of horizontal pieces of data) and saturation information of a Gaussian image with low resolution may be allocated as the minimum saturation value $S_{min}$ for each pixel group.

By step S1623, the absolute values Abs ($V_{VIS}^L$) and Abs ($V_{IR}^L$) of the pieces of edge information and the minimum saturation value $S_{min}$ will have been obtained. In step S1623, the image processing unit 107 selects edge information using these pieces of information.

In FIG. 16B, S denotes a maximum saturation value in an HSV color space. First, when the minimum saturation value is equal to or smaller than a first threshold ($S_{min} \leq 0.1S$), the image processing unit 107 considers the edge information $V_{VIS}^L$ of the visible light image to be clear edge information (step S1624). On the other hand, when the minimum saturation value is larger than a second threshold ($S_{min} > 0.7S$), the image processing unit 107 considers the edge information $V_{IR}^L$ of the infrared image to be clear edge information (step S1627). Otherwise or, in other words, when $0.1S < S_{min} \leq 0.7S$, the absolute value Abs ($V_{VIS}^L$) of the edge information of the visible light image is compared with the absolute value Abs ($V_{IR}^L$) of the edge information of the infrared image and the edge information with the larger absolute value is considered to be clear edge information (step S1625 or S1626). In this case, the two determination thresholds 0.1S and 0.7S are simply examples and other values may be used instead.

Moreover, when $0.1S < S_{min} \leq 0.7S$, instead of simply comparing Abs ($V_{VIS}^L$) and Abs ($V_{IR}^L$) with each other, a value obtained by multiplying Abs ($V_{IR}^L$) by a weight F in accordance with the minimum saturation value $S_{min}$ may be used for comparison. For example, a weight function may be expressed as F ($S_{min}$)=($S_{min}$−0.1S)/(0.7S −0.1S). In this case, when $0.1S < S_{min} \leq 0.7S$, if Abs ($V_{VIS}^L$) is larger than Abs (F ($S_{min}$) ×$V_{IR}^L$), the image processing unit 107 considers $V_{VIS}^L$ to be clear edge information (step S1625). On the other hand, if Abs ($V_{VIS}^L$) is equal to or smaller than Abs (F ($S_{min}$)×$V_{IR}^L$), the image processing unit 107 considers $V_{IR}^L$ to be clear edge information (step S1626). Alternatively, in step S1626, Abs (F ($S_{min}$)×$V_{IR}^L$) may be considered clear edge information.

While the absolute value Abs ($V_{VIS}^L$) and the absolute value Abs ($V_{IR}^L$) of the pieces of edge information are compared with each other in the present example, edge information may be selected by focusing on pieces of edge information of a specific resolution such as pieces of edge information of a visible light image and an infrared image of a level Ln of a Laplacian image pyramid. In this case, as edge information of another resolution, edge information of an image selected among a visible light image and an infrared image may be used or composite edge information of the visible light image and the infrared image may be used.

Let us now return to the description of FIG. 15. Once step S1530 is finished, clearer edge information will have been selected by comparing the visible light image and the infrared image with each other. Therefore, in step S1540, the image processing unit 107 derives brightness information $V_{VIS}^{new}$ based on the selected clearer edge information. The image processing unit 107 which determines brightness information $V_{VIS}^{new}$ (third brightness information) of an image having clear edge information by the processes of steps S1522 to S1540 corresponds to a determining unit.

Finally, in step S1550, the image processing unit 107 generates a visible light image with an extended depth of field using the brightness information $V_{VIS}^{new}$ obtained in step S1540 and the hue information H and the saturation information S derived in step S1523 described earlier.

This concludes the description of an imaging signal processing method and a configuration of an imaging apparatus for obtaining a visible light image with an extended depth of field based on a visible light image and an infrared image.

As described above, even with the configuration according to the present embodiment, in addition to image information of an in-focus distance region at wavelengths in a range of visible light, contour (edge) and/or brightness difference information in an out-of-focus distance region at wavelengths in the range of visible light is compensated by infrared image information having an in-focus distance which is different from that at wavelengths in the range of visible light range. As a result, a visible light image of which a depth of field has been extended beyond a distance between a subject and an imaging apparatus which comes into focus at wavelengths in the range of visible light is obtained while maintaining synchronism.

Third Embodiment

Figure 17A:
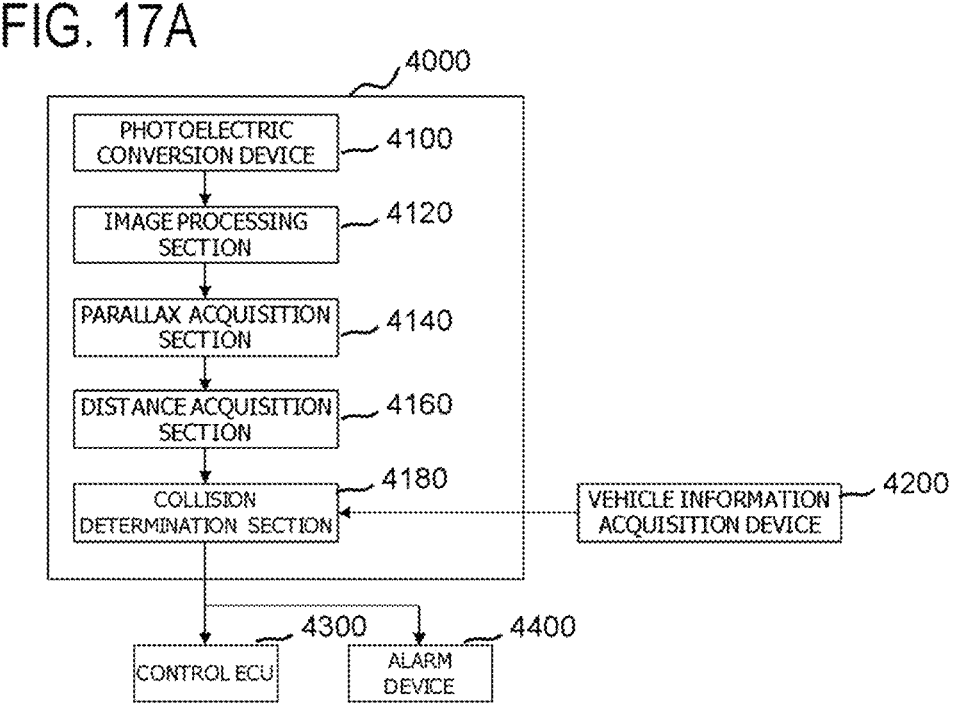
FIGS. 17A and 17B show configuration diagrams of a third embodiment.
Figure 17B:
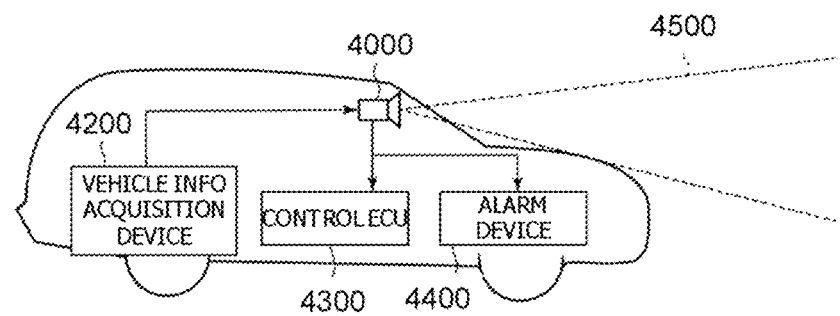

A imaging system and a moving body according to the Third Embodiment of the present invention will be described by reference to FIGS. 17A and 17B. FIGS. 17A and 17B are each a view showing the configuration of the photoelectric conversion system and the moving body according to the present embodiment.

FIG. 17A shows one example of a imaging system 4000 regarding a vehicle-mounted camera. The imaging system 4000 has an imaging device 4100. The imaging device 4100 is any of the imaging devices described in the First and Second Embodiments. The imaging system 4000 has an image processing part 4120 of a processing device for performing image processing on a plurality of image data acquired by the imaging device 4100, and a parallax acquisition part 4140 of a processing device for performing calculation of parallax (phase difference between parallax images) from a plurality of image data acquired from the imaging device 4100. In this embodiment, the image processing part 4120 performs the above described image processing (FIG. 7 and FIG. 15), but the image processing unit 107 in the imagine apparatus 4100 may perform this processing instead. Further, the imaging system 4000 has a distance acquisition part 4160 of a processing device for calculating the distance to the object based on the calculated parallax, and an impact determination part 4180 of a processing device for determining whether there is an impact possibility or not based on the calculated distance. Herein, the parallax acquisition part 4140 or the distance acquisition part 4160 is one example of information acquisition means for acquiring information such as the distance to the object. Namely, the distance information is information regarding the parallax, the defocus amount, the distance to the object, and the like. The impact determination part 4180 may determine the impact possibility using any of the distance information. The processing device may be implemented by hardware designed for exclusive use, or may be implemented by general-purpose hardware for performing operations based on a software module. Further, the processing device may be implemented by a field programmable gate array (FPGA), an application specific integrated circuit (ASIC), or the like, or may be implemented by a combination thereof.

The imaging system 4000 is connected with a vehicle information acquisition device 4200, and can acquire vehicle information such as the vehicle speed, the yaw rate, and the steering angle. Further, the imaging system 4000 is connected with a control ECU 4300 of a control device for outputting a control signal for generating a damping force to a vehicle based on the determination result at the impact determination part 4180. Namely, the control ECU 4300 is one example of moving body control means for controlling the moving body based on the distance information. Further, the imaging system 4000 is also connected with an alarm device 4400 for issuing an alarm to a driver based on the determination result at the impact determination part 4180. For example, when the impact possibility is high as the determination result of the impact determination part 4180, the control ECU 4300 brakes, returns the accelerator, suppresses the engine output, or performs other operations, and thereby performs vehicle control of avoiding an impact, and reducing the damage. The alarm device 4400 sounds an alarm such as a sound, displays alarm information on a screen of a car navigation system, or the like, applies a vibration to a sheet belt or a steering, or performs other operations, and thereby warns a user.

In the present embodiment, the periphery such as the front or the back of a vehicle is imaged by the imaging system 4000. FIG. 17B shows the imaging system 400 when the vehicle front (imaging region 4500) is imaged. The vehicle information acquisition device 4200 sends an instruction for the imaging system 4000 to operate, and to execute imaging. By using each imaging device of the First and Second Embodiments as the imaging device 4100, the imaging system 4000 of the present embodiment can be more improved in distance measurement precision.

In the description up to this point, a description has been given to the example in which control is performed so as to prevent the impact with another vehicle. However, the present invention is also applicable to control of following another vehicle for automatic driving, control of automatically driving so as not to deviate from the lane, and the like. Further, the imaging system is applicable to moving bodies (transport devices) such as ships, aircrafts, or industrial robots, not limited to vehicles such as cars. The moving bodies (transport devices) are various driving sources such as an engine, a motor, a wheel, and a propeller. In addition, the present invention is applicable to devices widely using object recognition such as Intelligent Transport System (ITS), not limited to the moving bodies.

Other Embodiments

The imaging device may have a structure (chip lamination structure) of lamination of a first semiconductor chip including pixels provided therein, and a second semiconductor chip including a read circuit (amplifier) provided therein. The read circuits (amplifiers) in the second semiconductor chip can be each a row circuit corresponding to the pixel row of the first semiconductor chip. Further, the read circuits (amplifiers) in the second semiconductor chip can each be a matrix circuit corresponding to the pixel or the pixel block of the first semiconductor chip. For the connection between the first semiconductor chip and the second semiconductor chip, there can be adopted connection by through electrode (TSV), interchip wiring by direct junction of a metal such as copper (Cu), interchip microbumping, or the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The above embodiments and arrangement examples are only those showing examples of embodiment in practicing the present invention, and shall not be those by which the technical scope of the present invention is construed as being restrictive. That is, the present invention may be practiced in various forms without deviation from its technical idea or its main features. In addition, the individual embodiments and the individual arrangement examples described above may be combined or modified whenever possible within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-113143, filed on Jun. 13, 2018, which is hereby incorporated by reference herein in its entirety.

What is claimed is:

1. An image processing apparatus comprising a processor configured to operate as:
    a first acquisition unit configured to acquire (a) a visible light image signal representing a visible-ray image which comes into focus at a first distance and (b) an infrared image signal representing (b1) an infrared-ray image which comes into focus at a second distance that is shorter than the first distance and (b2) an infrared-ray image which comes into focus at a third distance that is longer than the first distance;
    a second acquisition unit configured to acquire first brightness information, hue information, and saturation information from the visible light image signal and at least second brightness information from the infrared image signal;
    a third acquisition unit configured to acquire third brightness information based on edge information obtained from the first brightness information and edge information obtained from the second brightness information; and
    a generation unit configured to generate a second visible light image using the third brightness information, the hue information, and the saturation information.

2. The image processing apparatus according to claim 1, wherein the first acquisition unit is further configured to acquire, as the infrared image signal, a first infrared image signal representing an infrared-ray image which comes into focus at the second distance and a second infrared image signal representing an infrared-ray image which comes into focus at the third distance, and wherein the second acquisition unit is configured to extract, as the second brightness information, first infrared brightness information obtained from the first infrared image signal and second infrared brightness information obtained from the second infrared image signal.

3. The image processing apparatus according to claim 2, wherein the third acquisition unit is configured to determine, as the third brightness information, brightness information with a greatest edge strength among the first brightness information, the first infrared brightness information, and the second infrared brightness information.

4. The image processing apparatus according to claim 1, wherein the first acquisition unit is configured to acquire, as the infrared image signal, an image signal representing an image in which an infrared-ray image which comes into focus at the second distance and an infrared-ray image which comes into focus at the third distance are superimposed on one another.

5. The image processing apparatus according to claim 4, wherein the third acquisition unit is configured to determine, as the third brightness information, brightness information with a greatest edge strength among the first brightness information and the second brightness information.

6. The image processing apparatus according to claim 4, wherein the third acquisition unit is configured to determine the third brightness information based on the first brightness information, the second brightness information, and the saturation information.

7. The image processing apparatus according to claim 6, wherein the third acquisition unit is configured to
    determine the first brightness information as the third brightness information in a case where the saturation information is equal to or smaller than a first threshold,
    determine the second brightness information as the third brightness information in a case where the saturation information is larger than a second threshold that is larger than the first threshold, and
    determine the brightness information with a greatest edge strength between the first brightness information and the second brightness information as the third brightness information in a case where the saturation information is larger than the first threshold and smaller than the second threshold.

8. The image processing apparatus according to claim 6, wherein the third acquisition unit is configured to compare an edge strength obtained from the first brightness information with a value calculated by weighting and an edge strength obtained from the second brightness information by a weight based on the saturation information, and determine the third brightness information based on a result of the comparison.

9. An image processing method performed by an image processing apparatus, the image processing method comprising:
- a first acquisition step of extracting first brightness information, hue information, and saturation information from a visible light image signal representing a visible-ray image which comes into focus at a first distance, and acquiring at least second brightness information from an infrared image signal representing an infrared-ray image which comes into focus at a second distance that is shorter than the first distance and an infrared-ray image which comes into focus at a third distance that is longer than the first distance;
- a second acquisition step of acquiring third brightness information based on edge information obtained from the first brightness information and edge information obtained from the second brightness information; and
- a generation step of generating a second visible light image using the third brightness information, the hue information, and the saturation information.

10. The image processing method according to claim 9, wherein the infrared image signal includes a first infrared image signal representing an infrared-ray image which comes into focus at the second distance and a second infrared image signal representing an infrared-ray image which comes into focus at the third distance, and
wherein, in the first acquisition step, first infrared brightness information obtained from the first infrared image signal and second infrared brightness information obtained from the second infrared image signal are respectively extracted as the second brightness information.

11. The image processing method according to claim 10, wherein, in the second acquisition step, brightness information with a greatest edge strength among the first brightness information, the first infrared brightness information, and the second infrared brightness information is determined as the third brightness information.

12. The image processing method according to claim 9, wherein the infrared image signal is an image signal representing an image in which an image in an infrared light range which comes into focus at the second distance and an image in an infrared light range which comes into focus at the third distance are superimposed on one another.

13. The image processing method according to claim 12, wherein, in the second acquisition step, brightness information with a greatest edge strength among the first brightness information and the second brightness information is determined as the third brightness information.

14. The image processing method according to claim 12, wherein, in the second acquisition step, the third brightness information is determined based on the first brightness information, the second brightness information, and the saturation information.

15. The image processing method according to claim 14, wherein
in the second acquisition step,
the first brightness information is determined as the third brightness information when the saturation information is equal to or smaller than a first threshold,
the second brightness information is determined as the third brightness information when the saturation information is larger than a second threshold that is larger than the first threshold, and
the brightness information with a greatest edge strength between the first brightness information and the second brightness information is determined as the third brightness information in a case where the saturation information is larger than the first threshold and smaller than the second threshold.

16. The image processing method according to claim 14, wherein, in the second acquisition step, an edge strength obtained from the first brightness information is compared with a value calculated by weighting an edge strength obtained from the second brightness information by a weight based on the saturation information, and the third brightness information is determined based on a result of the comparison.

17. A non-transitory computer-readable medium which stores a program that causes a computer to execute the method according to claim 9.

18. An imaging apparatus comprising:
the image processing apparatus according to claim 1,
wherein the image processing apparatus generates the second visible light image from a visible light image signal and an infrared image signal.

19. A moving body comprising:
the image processing apparatus according to claim 1;
a moving apparatus;
a processing apparatus configured to acquire information from a signal output from the image processing apparatus; and
a control apparatus configured to control the moving apparatus based on the information.

* * * * *